United States Patent
Fitzgerald, II et al.

(10) Patent No.: US 9,235,401 B2
(45) Date of Patent: Jan. 12, 2016

(54) DEPLOYING UPDATES TO AN APPLICATION DURING PERIODS OF OFF-PEAK DEMAND

(71) Applicant: Amazon Technologies, Inc., Seattle, WA (US)

(72) Inventors: Joseph E. Fitzgerald, II, Seattle, WA (US); Marvin M. Theimer, II, Bellevue, WA (US); Eric J. Brandwine, Haymarket, VA (US); Benjamin W. Mercier, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/518,768

(22) Filed: Oct. 20, 2014

(65) Prior Publication Data

US 2015/0040117 A1    Feb. 5, 2015

Related U.S. Application Data

(63) Continuation of application No. 13/112,418, filed on May 20, 2011, now Pat. No. 8,869,135.

(51) Int. Cl.
| | | |
|---|---|---|
| G06F 9/44 | (2006.01) | |
| G06F 9/445 | (2006.01) | |
| G06F 9/455 | (2006.01) | |
| H04L 29/08 | (2006.01) | |

(52) U.S. Cl.
CPC .............. G06F 8/65 (2013.01); G06F 9/45533 (2013.01); H04L 67/10 (2013.01)

(58) Field of Classification Search
CPC ......................................................... G06F 8/65
USPC ................... 717/168–178; 709/202, 219–226
See application file for complete search history.

(56) References Cited

U.S. PATENT DOCUMENTS

| | | | |
|---|---|---|---|
| 6,687,901 B1 * | 2/2004 | Imamatsu ................. | G06F 8/65 |
| | | | 455/418 |
| 7,165,250 B2 | 1/2007 | Lyons | |
| 7,478,361 B2 | 1/2009 | Peteanu et al. | |
| 7,526,764 B2 | 4/2009 | Fanshier | |
| 8,046,540 B2 | 10/2011 | Smits et al. | |
| 8,046,694 B1 | 10/2011 | Lappas et al. | |
| 8,104,033 B2 | 1/2012 | Chiaramonte et al. | |
| 8,141,090 B1 | 3/2012 | Graupner et al. | |
| 8,161,475 B2 | 4/2012 | Araujo et al. | |
| 8,281,301 B2 * | 10/2012 | Kaneda ..................... | G06F 8/63 |
| | | | 717/168 |

(Continued)

OTHER PUBLICATIONS

Dougherty, B.; White, J.; Balasubramanian, J.; Thompson, C.; Schmidt, D.C., "Deployment automation with BLITZ," Software Engineering—Companion Volume, 2009. ICSE—Companion 2009. 31st International Conference on, pp. 271-274, May 16-24, 2009.*

(Continued)

*Primary Examiner* — Satish Rampuria
(74) *Attorney, Agent, or Firm* — Lee & Hayes, PLLC

(57) ABSTRACT

Update preferences might be utilized to specify that an update to an application should not be applied until the demand for the application falls below a certain threshold. Demand for the application is monitored. The update to the application is applied when the actual demand for the application falls below the specified threshold. The threshold might be set such that updates are deployed during the off-peak periods of demand encountered during a regular demand cycle, such as a diurnal, monthly, or yearly cycle.

21 Claims, 14 Drawing Sheets

(56) References Cited

U.S. PATENT DOCUMENTS

| | | | |
|---|---|---|---|
| 8,316,125 B2 | 11/2012 | DeHaan | |
| 8,321,858 B1* | 11/2012 | Marmaros et al. | 717/173 |
| 8,396,807 B1 | 3/2013 | Yemini et al. | |
| 8,433,801 B1 | 4/2013 | Yemini et al. | |
| 8,473,615 B1 | 6/2013 | Rowland et al. | |
| 8,484,355 B1 | 7/2013 | Lochhead et al. | |
| 8,504,443 B2 | 8/2013 | Ferris et al. | |
| 8,533,715 B2 | 9/2013 | DeLuca et al. | |
| 8,645,733 B2 | 2/2014 | Kansal et al. | |
| 2002/0166117 A1 | 11/2002 | Abrams et al. | |
| 2003/0135536 A1* | 7/2003 | Lyons | 709/103 |
| 2004/0088397 A1 | 5/2004 | Becker et al. | |
| 2004/0210653 A1 | 10/2004 | Kanoor et al. | |
| 2005/0015504 A1 | 1/2005 | Dorne et al. | |
| 2005/0021697 A1 | 1/2005 | Hunt et al. | |
| 2005/0262499 A1 | 11/2005 | Read | |
| 2005/0283759 A1 | 12/2005 | Peteanu et al. | |
| 2006/0242638 A1* | 10/2006 | Lew et al. | 717/168 |
| 2007/0074204 A1* | 3/2007 | Curtis et al. | 717/174 |
| 2008/0082977 A1 | 4/2008 | Araujo et al. | |
| 2008/0208365 A1* | 8/2008 | Grgic | G05B 19/042 700/2 |
| 2008/0294777 A1 | 11/2008 | Karve et al. | |
| 2009/0276771 A1* | 11/2009 | Nickolov et al. | 717/177 |
| 2009/0293056 A1 | 11/2009 | Ferris | |
| 2009/0313620 A1 | 12/2009 | Sedukhin et al. | |
| 2010/0107015 A1 | 4/2010 | Bernabeu-Auban et al. | |
| 2010/0154064 A1 | 6/2010 | Fang et al. | |
| 2011/0083122 A1* | 4/2011 | Chen | G06F 11/3668 717/124 |
| 2012/0066674 A1 | 3/2012 | Xie | |
| 2012/0124576 A1 | 5/2012 | Chiaramonte et al. | |
| 2012/0159469 A1* | 6/2012 | Laor | G06F 9/4555 717/173 |

OTHER PUBLICATIONS

Marchetti, C.; Baldoni, R.; Tucci-Piergiovanni, S.; Virgillito, A., "Fully distributed three-tier active software replication," Parallel and Distributed Systems, IEEE Transactions on, vol. 17, No. 7, pp. 633-645, Jul. 2006.*

Tse, S.S.F.; Moore, G.; Narang, S., "Self-Service Collaborative Applications: Automated Generation and Deployment of Applications Using a Visual Interface and Specification Tool," Collaborative Technologies and Systems, 2006. CTS 2006. International Symposium on, pp. 326-333, May 14-17, 2006.*

Ayed, D. "Deployment and Reconfiguration of Component-Based Applications in AMPROS", [online][retrieved on Mar. 1, 2013] retrieved from http://picolibre.int-evry.fr/projects/cvs/cdecomp/publications/PROW04.pdf, pp. 1-4.

Ayed et al, A Data Model for Context-aware Deployment of Component-based Applications onto Distributed Systems,: Downloaded Jan. 9, 2013 from https://www.scss.tcd.ie/conferences/COA-CAC-04/submissions/ayed.pdf, pp. 1-6.

Hall, R., "Agent-Based Software Configuration and Deployment, A Thesis Submitted to the Faculty of the Graduate School of the University of Colorado, in partial Fulfillment of the Requirement for the degree of Doctor of Philosophy Department of Computer Science", 1999, pp. 1-170.

Ayed, D. "Deployment and Reconfiguration of Component-Based Applications in AMPROS", [online][retrieved on Mar. 1, 2013] retrieved from http://picolibre.int-evry.fr/projects/cvs/cdecomp/publications/PROW04.pdf, pp. 1-4.

Zheng et al. "Deployment of Context-Aware Component-Based Applications Based on Middleware," J. Indulska et al. (Eds.): UIC 2007, Spring-Verlag Berlin Heidelberg, LNCS 4611, pp. 908-918.

Ayed et al, A Data Model for Context-aware Deployment of Component-based Applications onto Distributed Systems,: Downloaded Jan. 9, 2013 from https://www.scss.tcd.ie/comferences/COA-CAC-04/submissions/ayed.pdf, pp. 1-6.

Kim et al. "Dynamic Software Updates for Parallel High-Performance Applications", Concurrency Computat.: Pract. Exper. published 2011; 23: 415-434 [online][published online on Sep. 27, 2010], pp. 415-434.

Chaudron et al. Adaptive Runtime Fault Management for Service Instances in Component-Based Software Applications, The Institution of Engineering and Technology, 2007, pp. 18-28.

U.S. Official Action dated Feb. 13, 2013 in U.S. Appl. No. 13/112,390, filed May 20, 2011, First Named Inventor: Fitzgerald. 30 pps.

U.S. Official Action dated Jul. 2, 2013 in U.S. Appl. No. 13/112,390, filed May 20, 2011, First Named Inventor: Fitzgerald. 49 pps.

U.S. Official Action dated Nov. 6, 2013 in U.S. Appl. No. 13/112,390, filed May 20, 2011, First Named Inventor: Fitzgerald. 49 pps.

U.S. Official Action dated Jan. 21, 2014 in U.S. Appl. No. 13/112,390, filed May 20, 2011, First Named Inventor: Fitzgerald. 53 pps.

U.S. Notice of Allowance/Allowability dated Mar. 31, 2014 in U.S. Appl. No. 13/112,390, filed May 20, 2011, First Named Inventor: Fitzgerald. 22 pps.

U.S. Official Action dated Oct. 17, 2013 in U.S. Appl. No. 13/112,403, filed May 20, 2011, First Named Inventor: Fitzgerald. 19 pps.

U.S. Official Action dated Mar. 24, 2014 in U.S. Appl. No. 13/112,403, filed May 20, 2011, First Named Inventor: Fitzgerald. 16 pps.

U.S. Notice of Allowance/Allowability dated Jun. 5, 2014 in U.S. Appl. No. 13/112,403, filed May 20, 2011, First Named Inventor: Fitzgerald. 9 pps.

U.S. Official Action dated Mar. 11, 2013 in U.S. Appl. No. 13/112,418, filed May 20, 2011, First Named Inventor: Fitzgerald. 31 pps.

U.S. Official Action dated Jul. 16, 2013 in U.S. Appl. No. 13/112,418, filed May 20, 2011, First Named Inventor: Fitzgerald. 45 pps.

U.S. Official Action dated Dec. 27, 2013 in U.S. Appl. No. 13/112,418, filed May 20, 2011, First Named Inventor: Fitzgerald. 48 pps.

U.S. Notice of Allowance/Allowability dated Jun. 27, 2014 in U.S. Appl. No. 13/112,418, filed May 20, 2011, First Named Inventor: Fitzgerald. 15 pps.

* cited by examiner

DEPLOYING UPDATES TO AN APPLICATION DURING PERIODS OF OFF-PEAK DEMAND

CROSS REFERENCE TO RELATED APPLICATIONS

This application is a continuation of U.S. application Ser. No. 13/112,418, entitled "DEPLOYING UPDATES TO AN APPLICATION DURING PERIODS OF OFF-PEAK DEMAND" filed May 20, 2011, now U.S. Pat. No. 8,869,135 issued Oct. 21, 2014, which is expressly incorporated herein by reference in its entirety.

BACKGROUND

A programmable execution service ("PES") can provide computing resources for executing applications on a permanent or an as-needed basis. The computing resources provided by a PES may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute applications, including World Wide Web ("Web") servers, application servers, media servers, database servers, and the like. Data storage resources may include file storage devices, block storage devices, and the like. The resources provided by a PES can typically be purchased and utilized according to various financial models.

In order to maintain and upgrade a distributed software application, such as an application executing on a PES, it is commonly necessary to apply software updates to the application. For instance, it may be necessary to periodically apply software updates to various components of an application executing on a PES in order to implement security patches, bug fixes, or feature improvements. An update might install new software components, patch existing software components, remove software components from the application, and/or perform other tasks.

Updating an application executing on a PES (a "PES application") can be a complex process for various reasons. One reason is that multiple software developers and/or software development teams might concurrently develop updates to the PES application. A security development team might develop security updates for the application, a maintenance development team might develop bug fix updates for the application, and a new feature development team might develop new feature updates for the application. All of this type of development typically occurs in parallel, thereby resulting in the possibility that multiple different updates might be available for an application at any given time.

Disparate business and operational requirements can also cause updating an application executing on a PES to be a complex process. For instance, certain types of businesses and applications might require near 100% availability of an application, thereby making it difficult if not impossible to take the application offline to perform an update. Other types of businesses and PES applications might not have such strict availability requirements. As another example, it may be unacceptable for some businesses to incur costs for additional computing resources utilized to assist in performing an update to a PES application. Other businesses might be willing to incur a charge for additional computing resources used when performing an update if the update can be performed quickly and with a minimal possibility of an availability outage.

It is with respect to these and other considerations that the disclosure made herein is presented.

DETAILED DESCRIPTION

Figure 1:
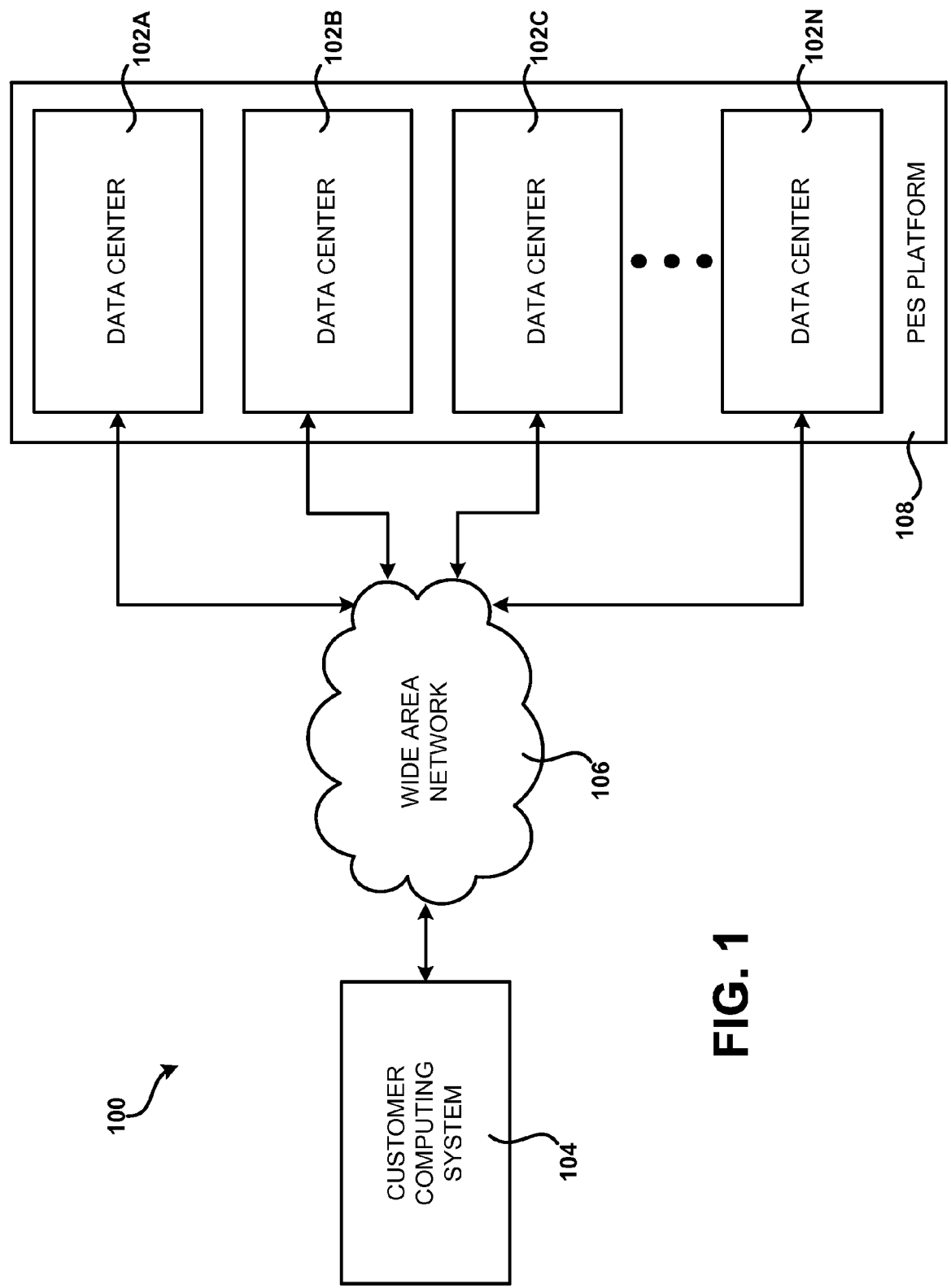
FIG. 1 is a system and network diagram showing aspects of one illustrative operating environment for the embodiments disclosed herein for updating a PES application.

The following detailed description is directed to technologies for optimized updating of applications. Utilizing the technologies described herein, updates can be deployed to an application, such as an application executing on a PES, in a way that is optimized for various economic, temporal, and operational factors identified by an owner or maintainer of the application. In this way, the updates can be applied to the application in a manner that satisfies various business and technical requirements related to the operation of the application.

According to one aspect disclosed herein, a PES platform is configured to provide instances of computing resources for executing an application. For example, the PES platform might provide virtual machine instances ("instances") for executing an application, such as an e-commerce application or another type of distributed application. Software components that implement the application are deployed to the virtual machine instances provided by the PES platform.

The PES platform is also provided with functionality for applying updates to the components of the application. As discussed above, it may be necessary to periodically apply software updates to various components of the application to implement security patches, bug fixes, feature improvements, or for other reasons. An update might install new software components, patch existing software components, remove software components from the application, and/or perform other tasks.

In order to deploy an update to the application, update preferences are specified that define various factors for use in determining how and when an update is to be deployed. For instance, economic factors may be specified that indicate the extent to which additional costs may be incurred during deployment of an update, such as for instantiating new virtual machine instances. As an example, some application owners might indicate that cost is no object during the deployment of updates. Other owners might indicate that no additional costs should be incurred during deployment of an update or that the additional costs be minimized. Other owners might indicate the conditions under which costs might be incurred, such as when the price for computing resources falls below a certain point.

The update preferences might also include temporal factors that indicate the extent to which time is a factor in deploying an update. For instance, some application owners might indicate that an update to an application should be deployed as quickly as possible. Other application owners might indicate that an update to an application can proceed more slowly. In other cases, the update preferences might specify that application of the updates be delayed until demand for the application falls below a certain threshold.

The update preferences might also include operational factors relating to the operation of the application during the deployment of an update. For instance, the operational factors might indicate the tolerance for a failure of the upgrade, the tolerance for an outage of the application, a level of confidence in the upgrade, and other types of operational factors. As will be discussed in greater detail below, the economic, temporal, and operational factors are utilized in creating an optimized plan for deploying an update to the application.

Once the update preferences have been specified, a deployment component operating within the PES platform utilizes the preferences to create a deployment plan. The deployment plan specifies how and when the update, or updates, is to be applied to the application in view of the specified preferences. In one embodiment, for example, the deployment plan might specify instructions for deploying the update in a manner that optimizes the update process based upon the factors set forth in the update preferences. The deployment plan is then utilized to deploy the update to the application.

Update preferences might be utilized to specify that one or more updates to an application should not be applied until the demand for the application falls below a certain threshold. Demand for the application is monitored. The updates to the application are applied when the actual demand for the application falls below the specified threshold. The threshold might be set such that updates are deployed during the off-peak periods of demand encountered during a regular demand cycle, such as a diurnal, monthly, or yearly cycle. Additional details regarding the various processes described above for updating an application, and others, will be presented below with regard to FIGS. 1-13.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 that includes a PES platform 108 for executing a distributed application.

The PES platform 108 can provide computing resources for executing the application on a permanent or an as-needed basis. The computing resources provided by the PES platform 108 may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute applications, including World Wide Web ("Web") servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the PES platform 108 are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for deploying updates to an application will be described below with regard to FIG. 2.

The customers and other consumers of the PES platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote consumers may be utilized. It should also be appreciated that combinations of such networks might also be utilized.

The customer computing system 104 is a computer utilized by a customer or other consumer of the PES platform 108. For instance, the customer computing system 104 may be a server computer, a desktop or laptop personal computer, a tablet computer, a wireless telephone, a personal digital assistant ("PDA"), an e-reader, a game console, a set-top box, or any other computing device capable of accessing the PES platform 108.

As will be described in greater detail below, the customer computing system 104 may be utilized to configure aspects of the computing resources provided by the PES platform 108. In this regard, the PES platform 108 might provide a Web interface through which aspects of its operation may be configured through the use of a Web browser application program executing on the customer computing system 104. Alternatively, a stand-alone application program executing on the customer computing system 104 might access an application programming interface ("API") exposed by the PES platform 108 for performing the configuration operations. Other mechanisms for configuring the operation of the PES platform 108, including deploying updates to an application, might also be utilized.

According to embodiments disclosed herein, the capacity of purchased computing resources provided by the PES platform 108 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of the PES platform 108 can be scaled on-demand.

Auto scaling is one mechanism for scaling computing resources in response to increases or lulls in demand for the resources. Auto scaling allows customers of the PES platform 108 to configure the platform 108 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. As will also be described in greater detail below, the auto scaling functionality provided by the PES platform 108 might also be utilized to provide additional capacity to an application during deployment of an update. Details regarding this process will be provided below.

As will also be described in greater detail below, the PES platform 108 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

The deployment component might also provide functionality for assisting customers with the deployment of updates to existing instances of computing resources. Through this mechanism, a customer can indicate that an update, or updates, is to be applied to an application executing on the PES platform. In response thereto, the deployment component is configured to apply the update to the application in an optimized fashion that satisfies any business or technical requirements of the customer. Additional details regarding a deployment component utilized by the PES platform 108 will be described below with regard to FIGS. 2-13.

Figure 2:
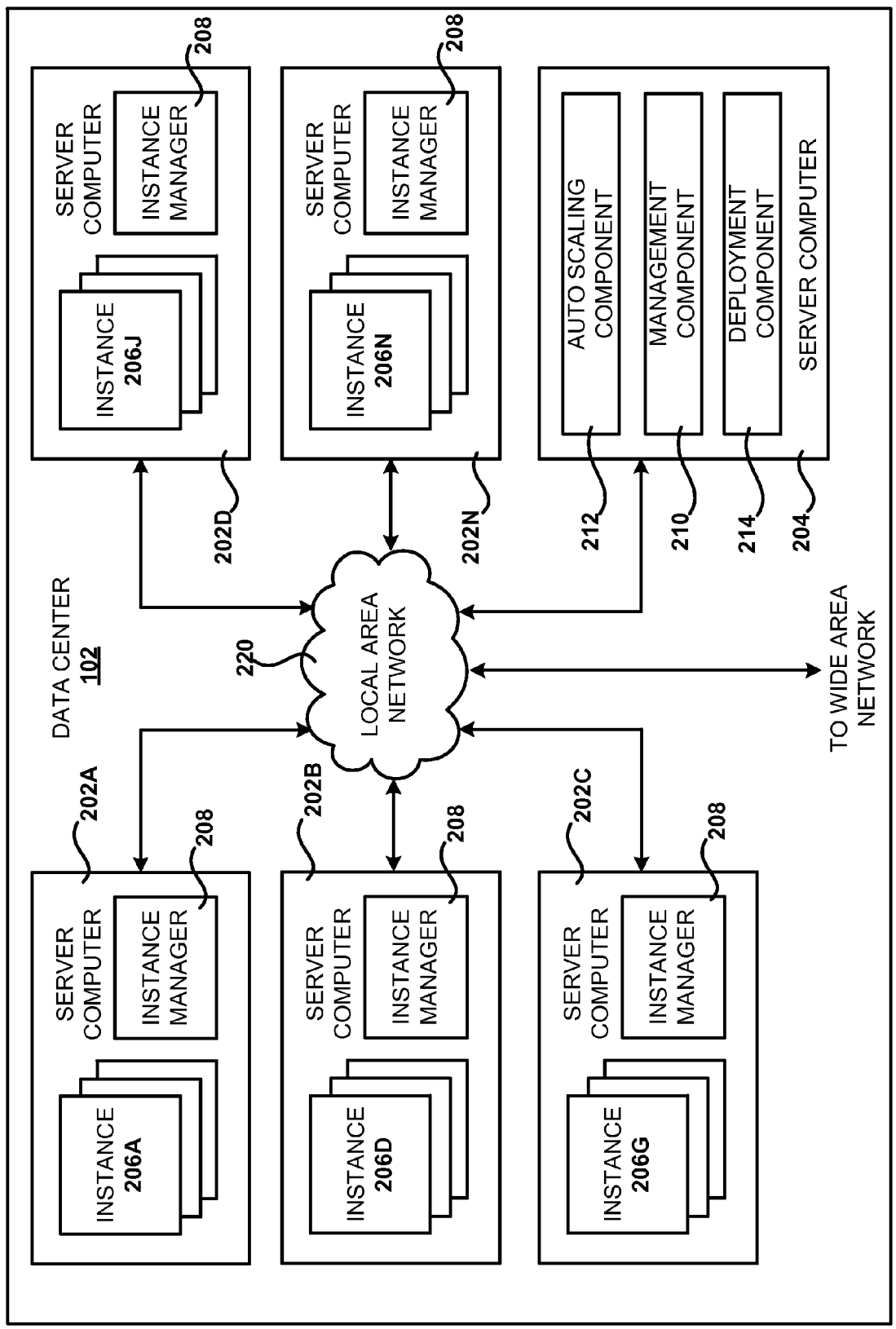
FIG. 2 is a computing system diagram that illustrates a configuration for a data center that implements the concepts and technologies disclosed herein for updating a PES application according to one embodiment.

FIG. 2 is a computing system diagram that illustrates one configuration for a data center 102 that implements a PES platform 108, including the concepts and technologies disclosed herein for updating an application. The example data center 102 shown in FIG. 2 includes several server computers 202A-202N (which may be referred herein singularly as "a server computer 202" or in the plural as "the server computers 202") for providing computing resources for executing an application. The server computers 202 may be standard server computers configured appropriately for providing the computing resources described above. For instance, in one implementation the server computers 202 are configured to provide instances 206A-206N of computing resources.

In one embodiment, the instances 206A-206N (which may be referred to herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the PES platform 108 might utilize the customer computing system 104 to access the management component 210 to configure various aspects of the operation of the PES platform 108 and the instances 206 purchased by the customer. For example, the customer may purchase instances and make changes to the configuration of the instances. The customer might also specify settings regarding how the purchased instances are to be scaled in response to demand.

An auto scaling component 212 scales the instances 206 based upon rules defined by a customer of the PES platform 108. In one embodiment, for instance, the auto scaling component 212 allows a customer to specify scale up rules for use in determining when new instances should be instantiated and scale down rules for use in determining when existing instances should be terminated.

The auto scaling component 212 may execute on a single server computer 204 or in parallel across multiple server computers 202 in the PES platform 108. In addition, the auto scaling component 212 may consist of a number of subcomponents executing on different server computers 202 or other computing devices in the PES platform 108. The auto scaling component 212 may be implemented as software, hardware, or any combination of the two. The auto scaling component 212 may monitor available computing resources in the PES platform 108 over an internal management network, for example. As will be described in greater detail below, the auto scaling component 212 might also be utilized to scale and de-scale instances during the deployment of an update to an application.

As discussed briefly above, the data center 102 is also configured with a deployment component 214 to assist customers in the deployment of new instances 206 of computing resources. The deployment component 214 may receive a configuration from a customer that includes data describing how new instances 206 should be configured. For example, the configuration might specify one or more applications that should be installed in new instances 206, provide scripts and/or other types of code to be executed for configuring new instances 206, provide cache warming logic specifying how an application cache should be prepared, and other types of information.

The deployment component 214 utilizes the customer-provided configuration and cache warming logic to launch, configure, and prime new instances 206. The configuration, cache warming logic, and other information may be specified by a customer using the management component 210 or by providing this information directly to the deployment component 214. Other mechanisms might also be utilized to configure the operation of the deployment component 214.

The deployment component 214 also provides functionality for deploying updates to an application. In this regard, the management component 210 might be configured to allow a customer to declare that one or more updates are available for an application and to provide update preferences indicating various factors regarding when and how the update should be performed. The deployment component 214 utilizes the update preferences to optimize the deployment of the updates to the instances in view of the various factors specified by the customer. Additional details regarding this process and other functionality provided by the deployment component 214 will be provided below with regard to FIGS. 3-13.

In the example data center 102 shown in FIG. 2, an appropriate LAN 220 is utilized to interconnect the server computers 202A-202N and the server computer 204. The LAN 220 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between each of the data centers 102A-102N, between each of the server computers 202A-202N in each data center 102, and between instances 206 purchased by each customer of the PES platform 108. These network topologies and devices should be apparent to those skilled in the art.

It should be appreciated that the data center 102 described in FIG. 2 is merely illustrative and that other implementations might be utilized. In particular, functionality described herein as being performed by the management component 210, the auto scaling component 212, and the deployment component 214 might be performed by other components or by a combination of these or other components. Additionally, it should be appreciated that this functionality might be implemented in software, hardware, or a combination of software and hardware. Other implementations should be apparent to those skilled in the art.

Figure 3:
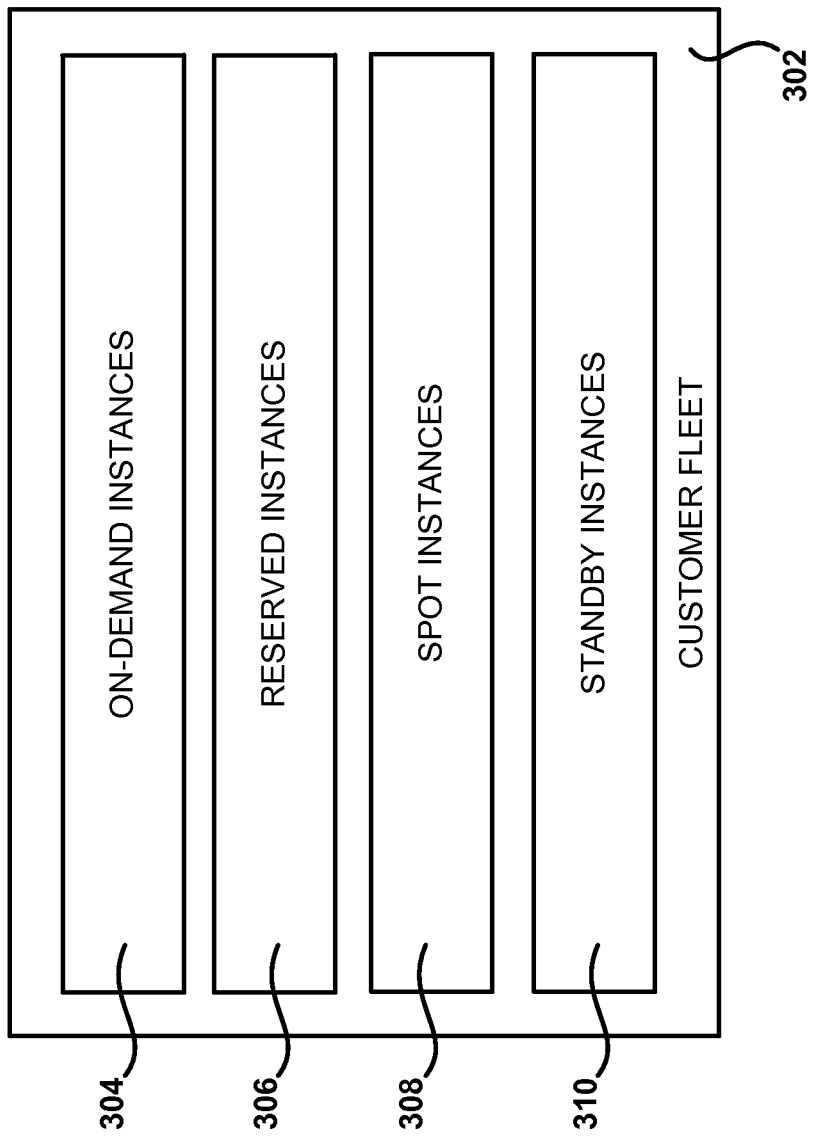
FIG. 3 is a block diagram illustrating various types of instances of computing resources that might be found in a customer fleet utilized to implement a PES application, according to embodiments disclosed herein.

FIG. 3 is a block diagram illustrating several types of instances 206 of computing resources that might be utilized in a customer fleet 302 to implement an application, according to embodiments disclosed herein. As used herein, the term "fleet" refers to all of the instances purchased and/or operated by a customer of the PES platform 108. As shown in FIG. 3, the instances provided by the PES platform 108 may be on-demand instances 304, reserved instances 306, spot instances 308, and standby instances 310. Other types of instances not shown in FIG. 3 or described herein might also be provided.

The on-demand instances 304, which might also be referred to herein as "regular" instances, are instances that are paid for and in active use by a customer. The on-demand instances 304 allow customers of the PES platform 108 to pay for capacity per unit of time, such as an instance-hour, without requiring a long-term commitment. This frees the customer from the costs and complexities of planning, purchasing, and maintaining hardware and transforms what are commonly large fixed costs into much smaller variable costs.

The reserved instances 306 are instances of a computing resource that are reserved for a customer in exchange for a payment. The reserved instances 306 provide the customer the option to make a one-time payment for each instance they want to reserve. In turn, the customer may receive a significant discount on the hourly usage charge for the reserved instances 306 as compared to the on-demand instances 304. After the customer makes a one-time payment for the reserved instances 306, the reserved instances 306 are reserved for the customer and the customer has no further obligation. The customer may choose to run the reserved instances 306 for the discounted usage rate for the duration of a chosen term. If the customer does not use the reserved instances 306, the customer will not pay usage charges on these instances.

The spot instances 308 allow customers to bid on unused capacity in the PES platform 108. The customer can run the spot instances 308 for as long as their bid exceeds a current market price, referred to herein as the spot instance market price, which may fluctuate based upon supply and demand. The spot instances 308 may be terminated if a customer's maximum bid no longer exceeds the current spot instance market price.

In order to obtain the spot instances 308, the customer places a request for the spot instances 308 that specifies the desired number of spot instances 308 and the maximum price the customer is willing to pay per instance hour. If the customer's maximum price bid exceeds the current spot instance market price for the spot instances 308, the customer's request will be fulfilled and the customer's spot instances 308 will run until either the customer chooses to terminate them or the market price increases above the customer's maximum price (whichever is sooner). Various components operating within the PES platform 108 may manage the market for the spot instances 308, including setting the current spot instance market price for the spot instances 308.

The standby instances 310 are spot instances 308 that have been acquired on behalf of a customer and that are made ready for near immediate use by the customer in the manner described herein. The price charged for the standby instances 310 is typically less than the price charged for the on-demand instances 304, since the standby instances 310 may be terminated in the same manner as the spot instances 308. In one embodiment, the standby instances 310 are priced higher than the spot instances 308 and the reserved instances 306, but lower than the on-demand instances 304. It should be appreciated, however, that the various pricing mechanisms described above for the on-demand instances 304, reserved instances 306, spot instances 308, and standby instances 310 are merely illustrative and that other mechanisms may be utilized to set the pricing for the various instance types.

Figure 4:
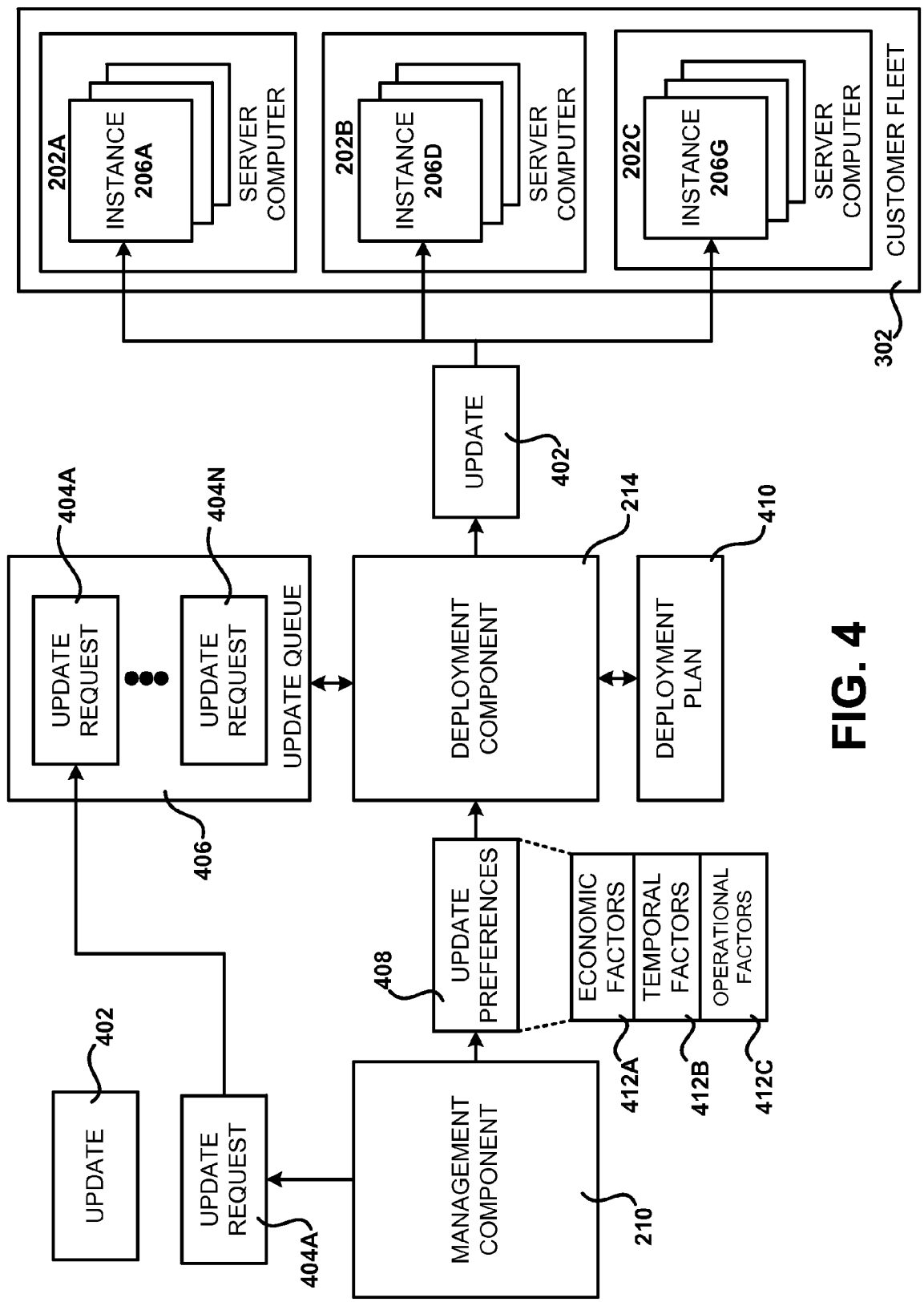
FIG. 4 is a computing system diagram showing aspects of the configuration and operation of a deployment component utilized in various embodiments disclosed herein for updating a PES application.

FIG. 4 is a computing system diagram showing aspects of the configuration and operation of a deployment component 214 utilized in various embodiments disclosed herein for deploying updates to an application. As discussed briefly above, the deployment component 214 provides functionality for deploying an application and for deploying updates to the application. As also discussed above, the functionality described herein as being performed by the deployment component 214 might be provided by another component or combination of components.

In one embodiment disclosed herein, the management component 210 is configured to provide functionality for allowing an owner or maintainer of an application to declare that an update 402, or updates, is available for the application. As discussed above, the update 402 might install new software components into the application, may patch existing software components in the application, may remove software components from the application, and/or perform other tasks for updating the components of the application.

In response to receiving an indication from an owner or maintainer of an application that an update 402 is available for deployment, the management component 210 might generate an update request 404A. The update request 404A indicates that an update 402 is ready for deployment to the application. The update request 404A might also provide other data, such as data identifying the update 402 and other information.

In one embodiment, the update request 404A is placed into an update queue 406. The update queue 406 is a queue utilized to store pending update requests 404A-404N for an application. Multiple individuals or groups might utilize the management component 210 concurrently to queue update requests 404A-404N. In one example, multiple software developers or software development teams concurrently develop updates 402 to the application. For instance, a security development team might develop security updates for the application, a maintenance development team might develop bug fix updates for the application, and a new feature development team might develop new feature updates for the application. Using the management component 210, each of the teams can concurrently declare the availability of an update 402, or updates, to the application, and the update requests 404A-404N for the updates 402 will be placed in the update queue 406 for deployment at an appropriate time and in an appropriate manner.

As illustrated in FIG. 4, the management component 210 might also be utilized to specify update preferences 408 for each update 402. The update preferences 408 define various factors for use by the deployment component 214 in determining how and when an update 402 is to be deployed. For instance, economic factors 412A may be specified that indicate the extent to which additional costs may be incurred during deployment of an update 402, such as for instantiating new virtual machine instances 206. As an example, some application owners might indicate that cost is no object during the deployment of updates. Other owners might indicate that no additional costs should be incurred during deployment of an update 402 or that the additional costs be minimized.

The update preferences 408 might also include temporal factors 412B that indicate the extent to which time is a factor in deploying an update 402. For instance, some application owners might indicate that an update 402 to an application should be deployed as quickly as possible. Other application owners might indicate that an update 402 to an application can proceed more slowly in order to minimize costs or other factors.

The update preferences 408 might also include operational factors 412C relating to the operation of the application during the deployment of an update 402. For instance, the operational factors 412C might indicate the tolerance for a failure of the upgrade 402, the tolerance for an outage of the application, a level of confidence in the upgrade 402, the tolerance for reduced application performance, and other types of operational factors. As will be discussed in greater detail below, the economic factors 412A, temporal factors 412B, and operational factors 412C are utilized in creating an optimized plan for deploying the update 402 to the application.

It should be appreciated that the update preferences 408 might include other types of factors than those disclosed herein. It should also be appreciated that the update preferences 408 might be specified generally or specifically. For instance, an owner of an application might simply indicate that the cost of deploying an update 402 should be minimized, that the speed of deploying an update 402 should be maximized, or other types of general indications of business and operational requirements for deploying an update 402. In another example, the owner of the application might indicate more specifically that new instances 206 may or may not be created during deployment of an update 402, that updates 402 may be merged, and other specific instructions regarding how the update 402 is to be applied. The management component 210 might provide an appropriate user interface for allowing the owner or maintainer of the application to define the update preferences 408. Additionally, the update preferences 408 may be included in an update request 404A, provided separately to the deployment component 214, or provided to the deployment component 214 in another manner.

Once the update preferences 408 have been specified for an update 402, the deployment component 214 utilizes the update preferences 408 to create a deployment plan 410. The deployment plan 410 specifies how and when the update 402, and potentially other updates 402 in the update queue 406, is to be applied to the application in view of the specified update preferences 408. In one embodiment, for example, the deployment plan 410 might specify instructions for deploying an update 402 in a manner that optimizes the update process according to the factors set forth by the owner or maintainer of the application in the update preferences 408. The deployment plan 410 is then utilized to deploy the update 402 to the application. For instance, the update 402 might be deployed to the instances 206A-206G executing on the server computers 202A-202C of the customer fleet 302.

The deployment plan 410 may contain various types and combinations of instructions for deploying an update 402, or multiple updates, depending upon the factors set forth in the update preferences 408 for the update 402. For instance, the deployment plan 410 might specify whether new virtual machine instances 206 may be created and utilized to deploy an update 402. If the update preferences 408 indicate that no additional costs should be incurred during the deployment of an update 402, then the deployment plan 410 might indicate that no new virtual machine instances 206 should be created during deployment. However, if the update preferences 408 indicate that it is acceptable to incur costs during the deployment of an update 402, then new virtual machine instances 206 might be created and utilized during the deployment of the update 402. Details regarding the use of additional virtual machine instances 206 during the deployment of an update 402 will be provided below.

The deployment plan 410 might also specify whether multiple updates might be "merged" during deployment. Merging updates refers to a process of skipping intermediate updates to a component when a later update is deemed to be reliable. For instance, three update requests 404 might be queued for the application: the first update request is for an update that upgrades a component in the application from version one to version two, the second update upgrades the same component to version three, and the third update upgrades the same component to version four. The third update might be installed on a limited number of instances 206 to determine if it is reliable. If so, other instances 206 might be upgraded directly to version four, thereby skipping the intermediate updates and allowing the deployment of the updates to proceed faster and at a lower cost than it might otherwise.

According to other embodiments, the deployment plan 410 might specify a number of distinct component version sets that may be executing on the instances 206 utilized to implement an application at any given time. The deployment plan 410 might also specify that the amount of time that a fleet 302 utilizes more than one component version set be minimized. In order to illustrate the concept of component version sets, the following notation will be utilized: {A.1, B.1, C.1, D.1}, where capital letters refer to components and numerals refer to versions. In this example, the component version set includes component A, version 1, component B, version 1, component C, version 1, and component D, version 1. Using this notation, updates 402 can be described as transitions from one component version set to another. For instance, {A.1, B.1, C.1}=>{A.2, B.1, C.2} identifies an update 402 that upgrades components A and C from version 1 to version 2.

The deployment plan 410 might also indicate that updates 402 should be applied to unused instances 206 in a prioritized manner. If an instance 206 has not received a request in some previous period of time, priority may be given to any updates queued for deployment to the instance 206. Prioritized deployment to unused instances 206 may result in quicker deployment of updates 402 and result in a lower cost of deployment since it may be unnecessary to add new instances 206 during deployment of an update to an unused instance 206.

The deployment plan 410 might also indicate that deployment of updates 402 to an application should occur during periods of off-peak demand for the application. In one embodiment, a demand cycle for the application is identified through monitoring demand for the application or in another fashion. The demand cycle might be based upon a diurnal cycle, a monthly cycle, a yearly cycle, or another type of regular cycle. Once the demand cycle has been identified, the updates 402 to the application might be applied during periods of off-peak demand, thereby potentially reducing the cost of deployment of the updates 402. Additional details regarding this process are provided below with respect to FIG. 11.

The deployment plan 410 might also indicate how and when unneeded instances may be de-scaled during or following deployment of an update 402. For instance, it may be necessary or desirable to de-scale one or more instances 206 in a customer fleet 302 following the deployment of an update 402. The deployment plan 410 might specify that instances 206 should be de-scaled according to the percentage of a paid-for time period that has been utilized. In this manner, the customer of the PES platform 108 will receive full benefit of the paid for time period prior to termination of instances. The deployment plan 410 might also specify that the instances 206 are not to be terminated until the end of a paid-for time period. Additional details regarding this process will be provided below with reference to FIG. 12.

The deployment plan 410 may also specify the manner in which an update 402 should be deployed to various types of instances 206 within a customer fleet 302. For instance, certain types of applications and customers might specify a number of required instances 206 for an application and a number of desired instances 206 for the application. The number of required instances 206 specifies a minimum number of regular instances 206 that are necessary for operation of the application. The number of desired instances 206 specifies a number of optional instances 206 that are to be utilized if certain conditions are met, such as the price of the desired instances 206 remains below a certain threshold. The deployment plan 410 might specify that desired instances 206 for an application may be utilized to facilitate the upgrade of the application and that the number of required instances 206 for the application does not fall below the specified number. Additional details regarding this process will be provided below with regard to FIG. 8.

The deployment plan 410 might also specify mechanisms to address various operational factors 412C set forth in the update preferences 408. For instance, the update preferences 408 might specify that a risk of a failed update 402 or application unavailability be minimized. In this case, the deployment plan 410 might specify that new instances 206 be deployed rather than patching existing instances 206. Alternatively, or in addition thereto, the deployment plan 410 might specify that significant testing be performed on an update 402 prior to applying the update 402 to all of the instances 206 in a fleet 302. This might be accomplished by applying an update 402 to a subset of the instances 206 in a fleet 302, performing testing on the updated instances 206, and deploying the update 402 to the remainder of the instances 206 if the testing is successful. If testing is not successful, the update 402 may not be deployed to the remainder of the fleet 302.

The deployment plan 410 might also specify that instances 206 be replaced after a specified number of patches have been applied to the instances 206. For instance, a customer might specify that instances 206 that have been patched in excess of 1000 times be replaced by new instances 206 created using the most current version of the application. This process addresses the possibility that instances of an application might become unstable after a certain number of patches have been applied thereto.

The deployment plan 410 might also specify that other mechanisms for minimizing the cost of an update deployment be utilized. For instance, the deployment plan 410 might indicate that network bandwidth or other computing resources be minimized during deployment. In this scenario, the instances 206 may be patched rather than utilizing a new image for the instances 206. If the cost of network bandwidth is not a concern, new virtual machine images might be applied to the instances 206. Similarly, the deployment plan 410 might specify that new instances 206 be created rather than deploying updates by applying patches when the network bandwidth utilized to install two or more patches is greater than the network bandwidth utilized to create a new instance 206 at an up-level version of the application.

It should be appreciated that the various features of the deployment plan 410 described above are merely illustrative and that other factors and considerations for deploying updates in an optimized fashion might also be utilized to create the deployment plan 410. For instance, factors might be considered when creating the deployment plan 410 such as the current time of day, instance hour pricing, spot market rates, level of testing required for an update, level of confidence in an update, the size of an update or updates, expected and actual time to deploy an update, importance of deploying an update quickly, number of queued update requests, current and anticipated load on the application, current and anticipated future cost of deploying updates, application performance, anticipated time to complete an update or updates, price of network bandwidth or other computing resources, performance of individual instances or a fleet 302, actual or anticipated time to deploy patches or create new instances 206, other update requests 404 in the update queue 406, and other economic, temporal, and/or operational factors. It should also be appreciated that the deployment component 214 might also update and modify the deployment plan 410 during the deployment of an update 402 in order to take into account changing factors, such as the time of day, current spot instance pricing, application performance, and others.

As discussed above, the deployment component 214 attempts to deploy updates in a manner that is optimized for the business and technical considerations defined in the update preferences 408. In this regard, the deployment component 214 attempts to generate a deployment plan 410 for deploying an update 402, or updates, optimally in view of the specified preferences 408. The deployment plan 410 might specify that combinations of the mechanisms described above be utilized to deploy the update 402 in an optimal fashion.

It should be appreciated, however, that generating a truly optimized deployment plan 410 might not be possible in view of the specified update preferences 408. In these cases, the deployment component 214 attempts to satisfy the constraints set forth in the update preferences 408 as well as possible. An owner or maintainer of the application might be notified if it is not possible to meet the specified constraints on the deployment of an update 402. For instance, if the update preferences 408 specify that an update 402 is to be applied without incurring additional costs but this is not possible, then the owner or maintainer of the application might be notified and requested to modify the update preferences 408 or take other corrective action.

Figure 5:
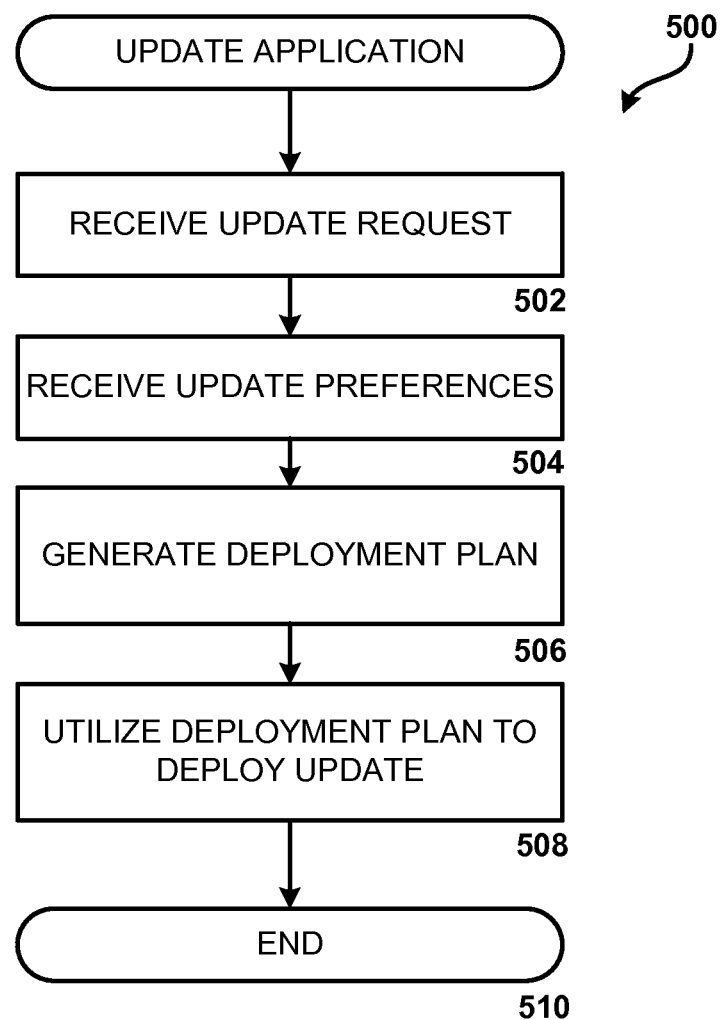
FIG. 5 is a flow diagram showing one illustrative routine for updating a PES application, according to one embodiment disclosed herein.

Turning now to FIG. 5, additional details will be provided regarding one illustrative process disclosed herein for deploying updates to an application. It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing a routine 500 illustrating aspects of the operation of a deployment component 214 utilized in various embodiments disclosed herein for deploying updates to an application. In one embodiment, the routine 500 is performed by the deployment component 214. It will be appreciated that another module or component may also perform the routine 500, such as the management component 210. A combination of modules and components might also perform the routine 500.

The routine 500 begins at operation 502, where the deployment component 214 retrieves an update request 404 from the update queue 406. As discussed above, the management component 210 may provide functionality for allowing a user to declare the availability of an update 402. In response thereto, the management component 210 enqueues an update request 404 on the update queue 406 for the update 402. The deployment component 214 retrieves an update request 404 from the update queue 406 at operation 502. The routine 500 then proceeds to operation 504.

At operation 504, the deployment component 214 receives the update preferences 408 for the update request 404 that was retrieved from the update queue 406. As discussed above, the management component 210 might provide functionality for defining update preferences 408 for the update 402. As also discussed above, the update preferences 408 define various factors for use in determining how and when an update 402 is to be deployed, like economic factors 412A, temporal factors 412B, and/or operational factors 412C. The update preferences 408 might be contained in the update request 404 or otherwise associated therewith. From operation 504, the routine 500 proceeds to operation 506.

At operation 506, the deployment component 214 generates a deployment plan 410 for the update 402. As discussed above, the deployment plan 410 specifies how and when an update 402, or updates, is to be applied to the application in view of the specified update preferences 408. The deployment plan 410 might specify instructions for deploying the update 402 in a manner that attempts to optimize the update process based upon the factors set forth by the owner or maintainer of the application in the update preferences 408. From operation 506, the routine 500 proceeds to operation 508.

At operation 508, the deployment plan 410 is utilized to deploy the update 402 to the application. As discussed above, deployment of the update 402 might be performed in many different ways depending upon the specified update preferences 408 and other factors. For instance, new instances 206 might be purchased and utilized to provide additional computing capacity during deployment of an update 402, updates might be merged, the number of concurrent unique component sets might be restricted, updates might be prioritized for unused instances 206, and/or deployment might be performed during off-peak periods of a demand cycle. Other types of processes, procedures, and mechanisms might also be utilized to deploy an update 402, or updates, in a manner that is optimized for the specified update preferences 408. The routine 500 might also be repeated to deploy multiple updates or might be performed in multiple concurrent instances in order to deploy multiple updates to multiple applications simultaneously. Once the update 402 has been deployed, the routine 500 proceeds to operation 510, where it ends.

FIGS. 6-10 are timing diagrams showing various aspects of the processes disclosed herein for deploying an update 402 with reference to several illustrated fleets 302 of instances 206 utilized to implement an application, according to embodiments disclosed herein. It should be appreciated that the examples shown in FIGS. 6-10 have been simplified and that these examples are merely illustrative and should not be considered limiting in any way.

Figure 6:
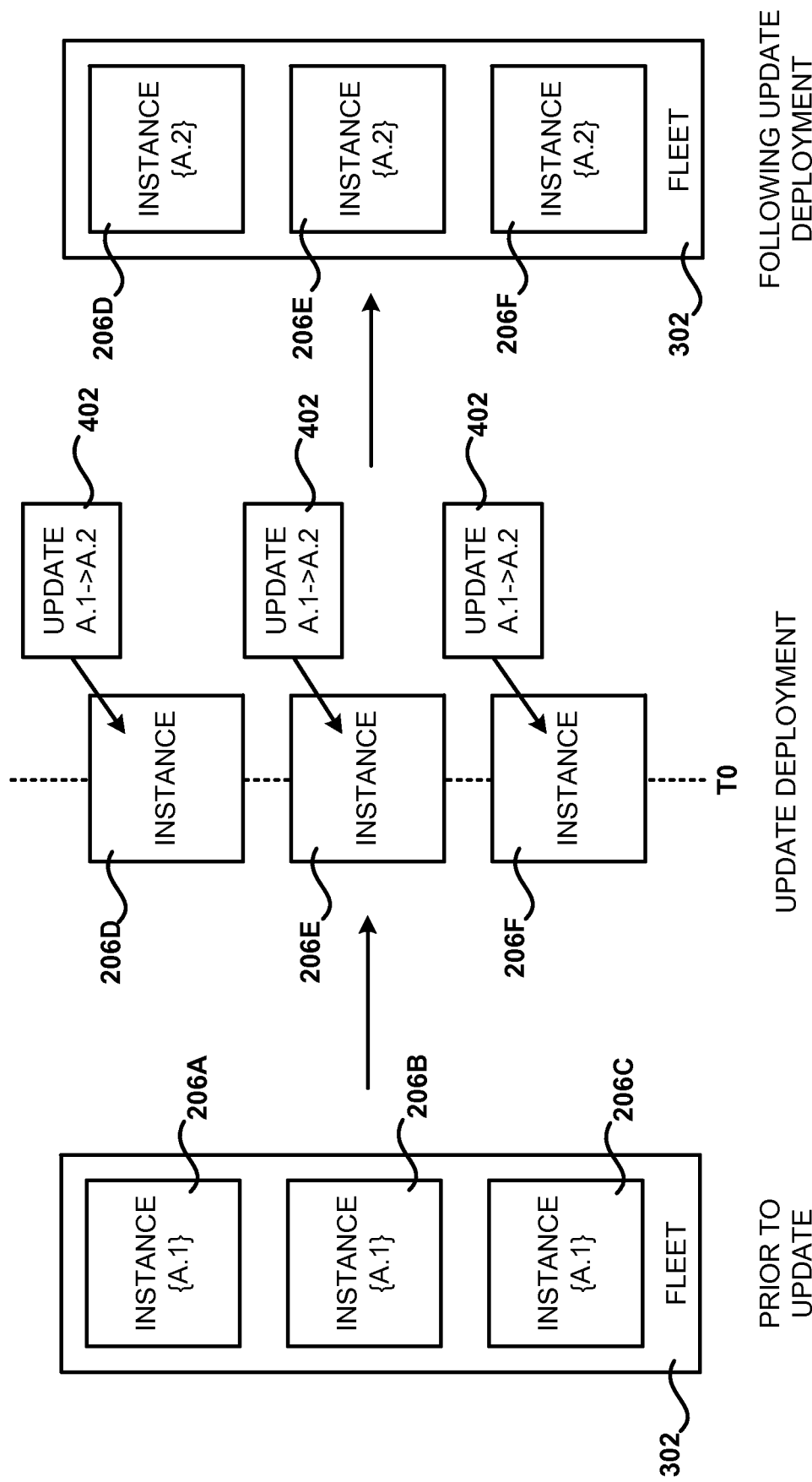
FIGS. 6-10 are timing diagrams showing various aspects of the processes disclosed herein for deploying updates with reference to several illustrated fleets of instances utilized to implement a PES application, according to embodiments disclosed herein.

In the example shown in FIG. 6, the fleet 302 includes three instances 206A-206C that have a component set {A.1} installed thereupon. Additionally, in this example an owner or maintainer of the fleet 302 has declared an update 402 for updating the entire fleet 302 from {A.1} to {A.2}. The owner or maintainer of the fleet 302 has also specified update preferences 408 indicating that additional instances 206 may be purchased to deploy the update 402 in an efficient manner while eliminating any downtime for the fleet 302. Consequently, additional instances 206D-206F have been instantiated to provide additional capacity during the deployment of the update 402. These instances 206D-206F might be purchased from the spot market described above. The update 402 is then applied to the new instances 206D-206F.

Once the update 402 has been applied to the new instances 206D-206F, the new instances 206D-206F are added to the fleet 302. The instances 206D-206F are then configured to begin handling a workload for the application. For example, the instances 206D-206F might be added to a load balancer for the fleet 302. Once the new instances 206D-206F have been added to the fleet 302, the down-level instances 206A-206C may be removed from the fleet 302. In this manner, all of the instances 206 in the fleet 302 have been upgraded from {A.1} to {A.2}. The owner or maintainer of the fleet 302 incurs an additional expense for the three additional instances utilized while the deployment of the update 402 was being performed. The mechanism illustrated in FIG. 6 might be utilized when the owner or maintainer of the fleet 302 specifies that cost is not an object when upgrading the fleet 302 or when the cost of new instances 206 is very low.

Figure 7:
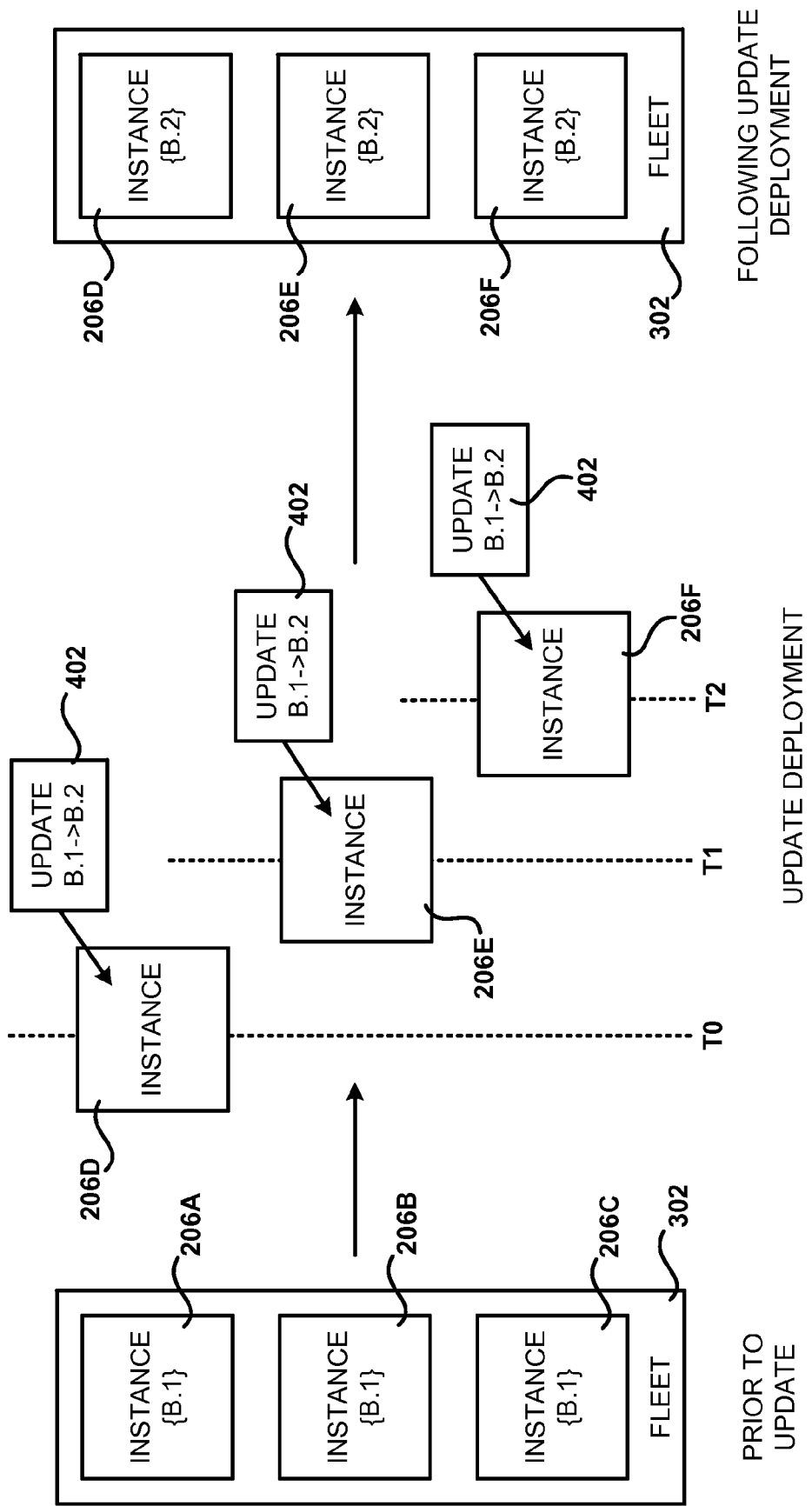

In the example shown in FIG. 7, the fleet 302 includes three instances 206A-206C that have a component set {B.1} installed thereupon. Additionally, in this example an owner or maintainer of the fleet 302 has declared an update 402 for updating the entire fleet 302 from {B.1} to {B.2}. The owner or maintainer of the fleet 302 has also specified update preferences 408 indicating that additional instances 206 may be purchased to deploy the update 402 in an efficient manner while eliminating any downtime for the fleet 302. In this example, however, the owner or operator of the fleet 302 has indicated that the number of purchased instances should be minimized. Consequently, only a single instance 206D is purchased at time $T_0$ to provide additional capacity during the deployment of the update 402. The update 402 is then applied to the new instance 206D.

Once the update 402 has been applied to the new instance 206D, the new instance 206D is added to the fleet 302. The new instance 206D is then configured to begin handling a workload for the application. For example, the instance 206D might be added to a load balancer for the fleet 302. Once the new instance 206D has been added to the fleet 302, one of the down-level instances 206A-206C may be removed from the fleet 302.

At time $T_1$, a new instance 206E is created and updated to {B.2}. The new instance 206E is then added to the fleet and one of the down-level instances 206A-206C is removed from the fleet. Similarly, at time $T_2$, a new instance 206F is created and updated to {B.2}. The new instance 206F is then added to the fleet and one of the down-level instances 206A-206C is removed from the fleet. In this manner, the entire fleet 302 has been upgraded from {B.1} to {B.2}. The application of the update 402 shown in FIG. 7 proceeds more slowly than the example shown in FIG. 6, however, the costs are reduced as compared to the previous example. This type of deployment might be utilized when instance costs are high or when the deployment process occurs during a peak period of demand when costs and sensitivity to outages might be higher.

Figure 8:
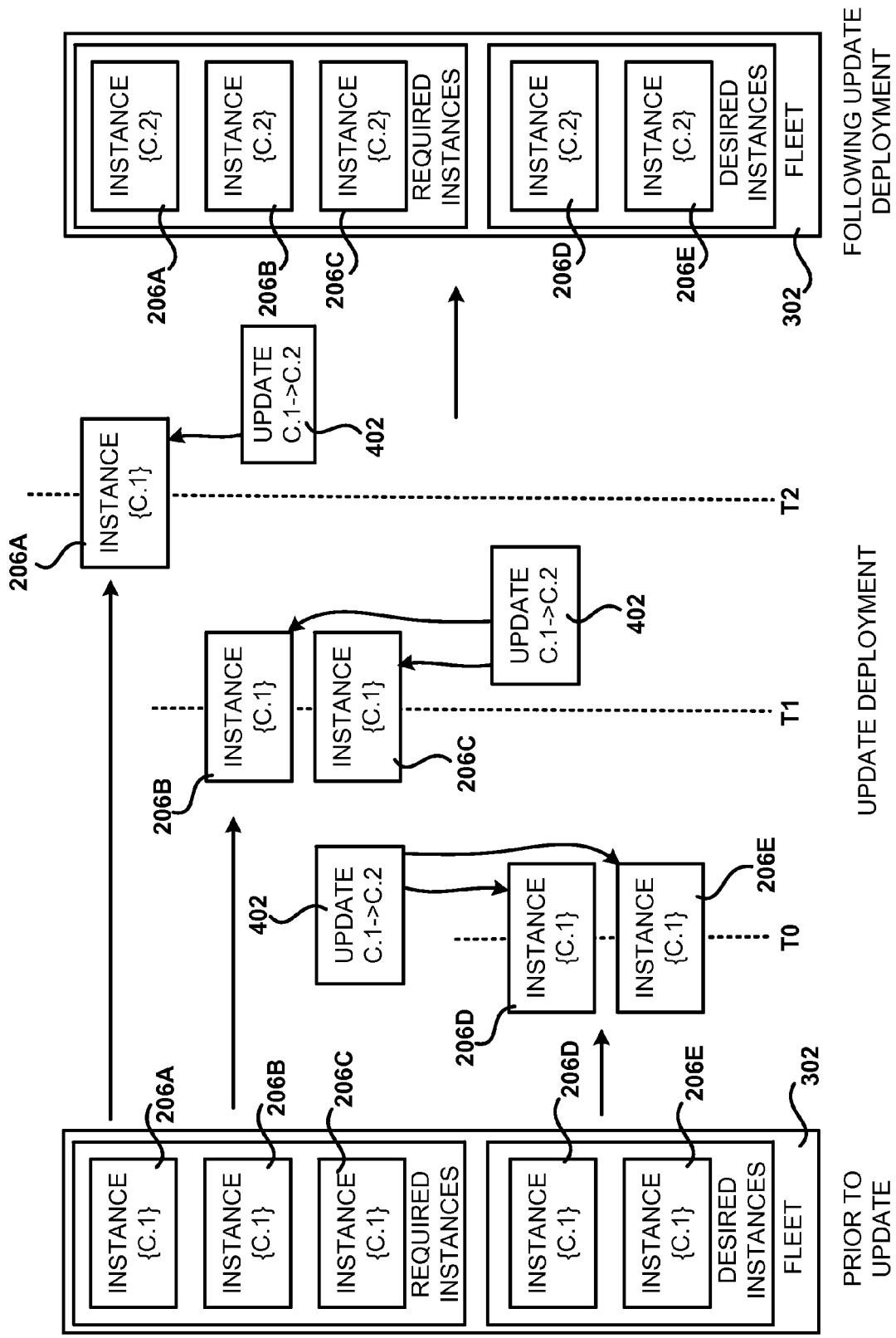

In the example shown in FIG. 8, the fleet 302 includes five instances 206A-206E that have a component set {C.1} installed thereupon. Additionally, in this example an owner or maintainer of the fleet 302 has declared an update 402 for updating the entire fleet 302 from {C.1} to {C.2}. The owner or maintainer of the fleet 302 has also indicated that the fleet must maintain a minimum of three instances (required instances) and, if possible, would include five instances (two desired instances). The desired instances 206D-206E might be standby instances 310 purchased from a spot market. The owner or maintainer of the fleet 302 has also specified update preferences 408 indicating that additional instances 206 may not be purchased to deploy the update 402. Consequently, no new instances 206 are purchased to assist in the deployment of the update 402 in the example shown in FIG. 8.

In order to deploy the update 402 without purchasing any new instances 206 and while maintaining the specified number of required instances in the fleet 302, the instances 206D and 206E are removed from the fleet 302 (e.g. by removing these instances from a load balancer) and the update 402 is applied to these instances at time $T_0$. The upgraded instances 206D and 206E are then placed back into to the fleet 302.

At time $T_1$, the instances 206B and 206C are removed from the fleet 302 and the update 402 is applied to these instances. The fleet 302 maintains the specified number of required instances during the application of the update 402. The upgraded instances 206B and 206C are then placed back into the fleet 302. At time $T_2$, the instance 206A is removed from the fleet 302 and the update 402 is applied to this instance. The instance 206A is then placed back into the fleet 302. In this manner, the entire fleet 302 is upgraded from {C.1} to {C.2} without purchasing any new instances and while maintaining the specified number of required instances in the fleet 302.

Figure 9:
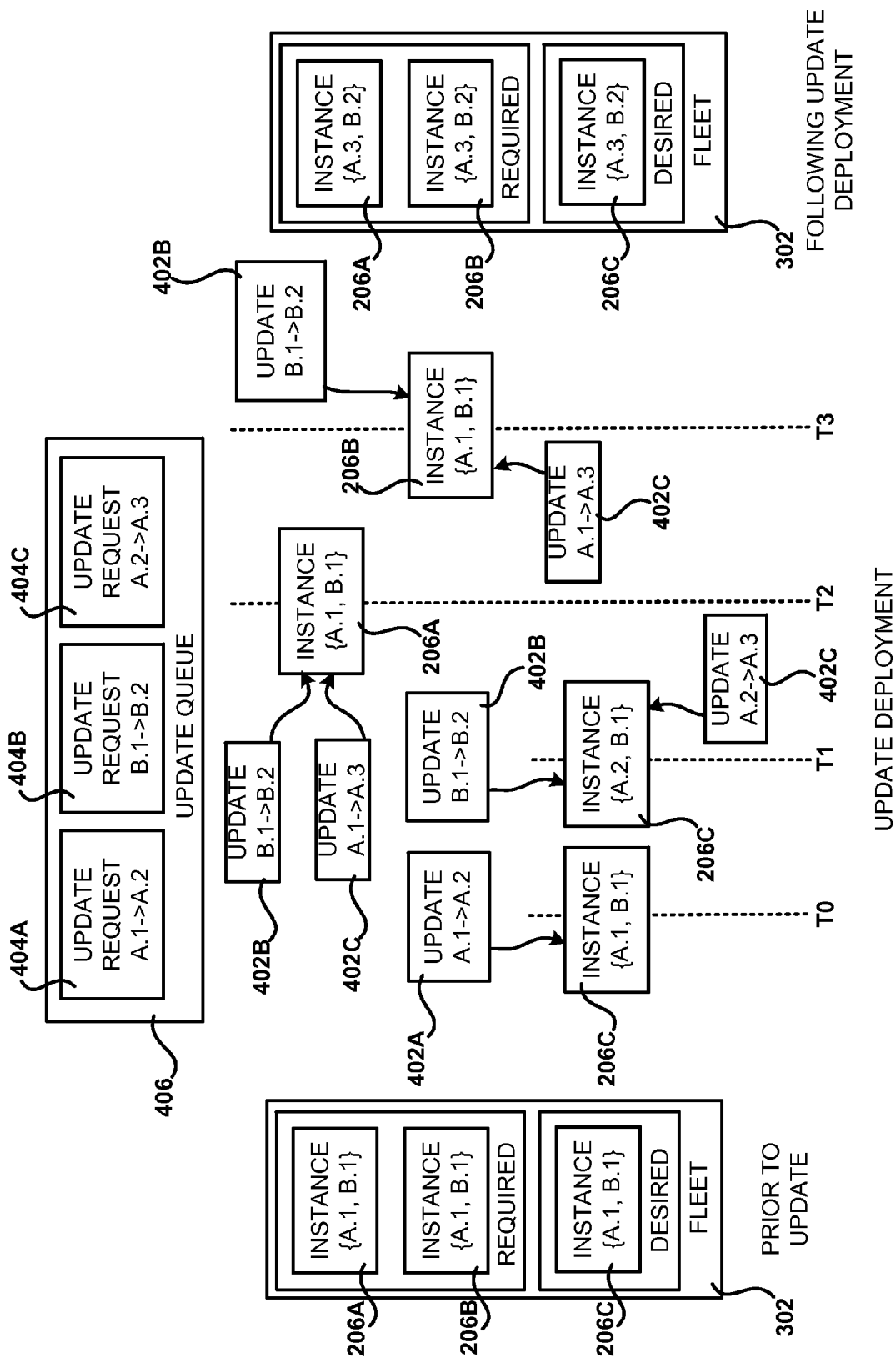

The example shown in FIG. 9 illustrates the concept of merging updates described briefly above. In this example, a fleet 302 includes three instances 206A-206C that have a component set {A.1, B.1} installed thereupon. The owner or maintainer of the fleet 302 has declared three updates 402A-402C to the fleet 302. Update requests 404A-404C corresponding to the updates 402A-402C have been placed in the update queue 406. The update 404A updates component A.1 to A.2, the update 404B updates component B.1 to B.2, and the update 404C updates component A.2 to A.3. The owner or maintainer of the fleet 302 has also specified in the update preferences 408 that no new instances should be acquired during deployment of the update 402 and that updates to the fleet 302 may be merged where possible.

In order to apply the updates 402A-402C to the fleet in FIG. 9, the update 402A is first applied to the instance 206C at time $T_0$, thereby updating the instance 206C from {A.1, B.1} to {A.2, B.1}. At time $T_1$, the update 402C is applied to the instance 206C, thereby updating the instance 206C from {A.2, B.1} to {A.3, B.1}. Following application of the update 402C to the instance 206C, manual or automated testing may be performed on the updated instance 206C to ensure that application of the updates 402A and 402C were successful and that the instance 206C is stable. The testing of upgraded instances can improve confidence in an update, thereby permitting intermediate updates to be skipped. More or less testing might be performing on updates depending upon the price of instances. If instances are less expensive, then a greater amount of testing might be performed on updates and/or various combinations of updates.

If the instance 206C is stable and operating correctly, the updates 402A and 402C may be merged, thereby causing the subsequent instance to be updated directly to A.3 and bypassing A.2. Consequently, the updates 402B and 402C are applied to the instance 206A at time $T_2$ without application of the update 404A to the instance 206A. Similarly, the updates 402B and 402C are applied to the instance 206B at time $T_3$ without application of the update 404A to the instance 206B. This results in the upgrading of the entire fleet 302 to the component set {A.3, B.2} in less time than it would have taken had the updates 402A and 402C not been merged. It should be appreciated that more than two updates might be merged in this manner in other embodiments, thereby saving additional time and expense.

Figure 10:
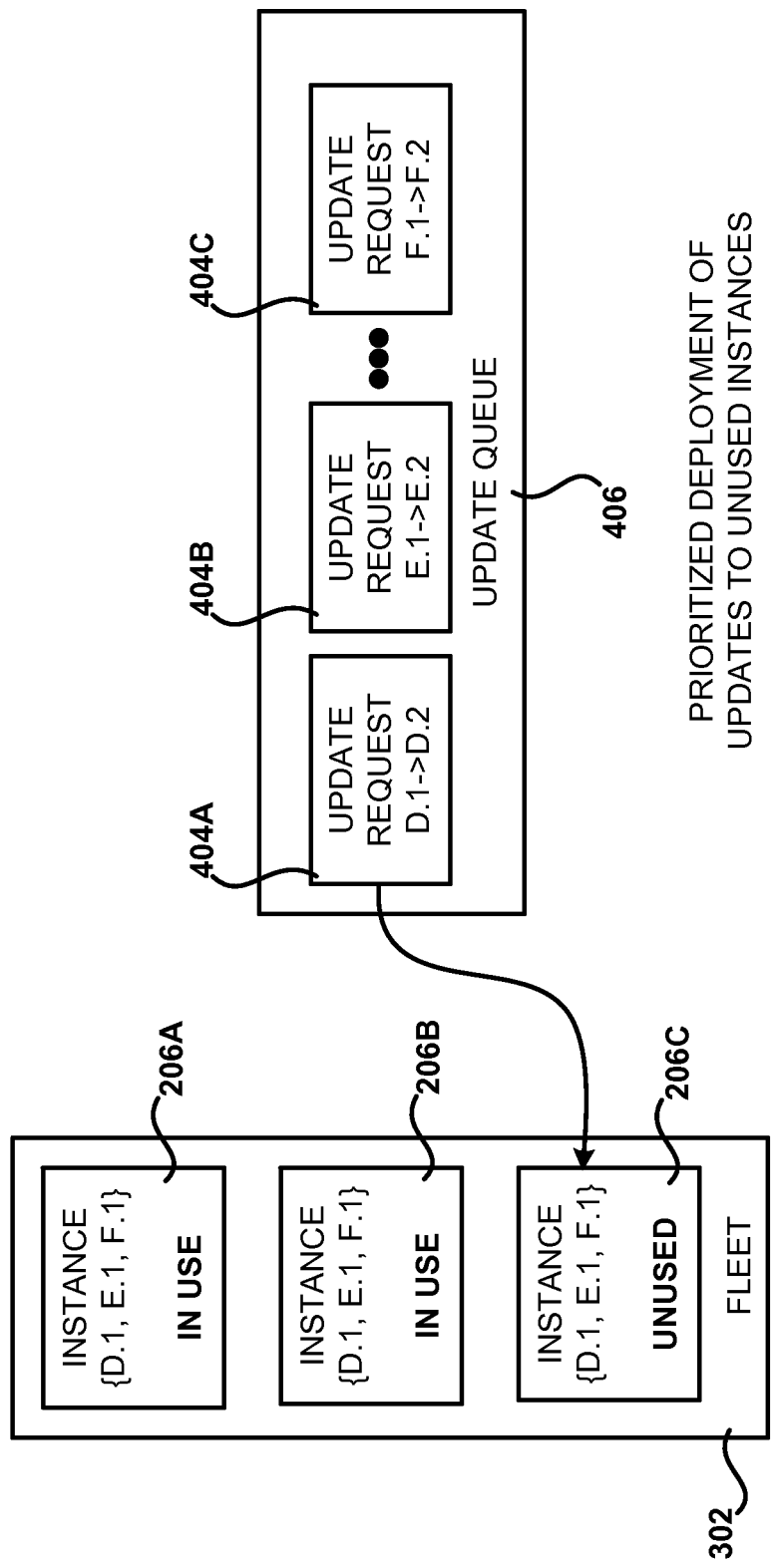

The example shown in FIG. 10 illustrates one process for prioritizing deployment of updates to unused instances. In the example shown in FIG. 10, a fleet 302 includes three instances 206A-206C that have component set {D.1, E.1, F.1} installed thereupon. Three update requests 404A-404C have been queued in the update queue 406. The first update request 404A is for updating component D.1 to D.2, the second request 404B is for updating component E.1 to E.2, and the third request 404C is for updating component F.1 to F.2.

In the example shown in FIG. 10, the instances 206A and 206B are active handling requests for the application. The instance 206C, however, has not recently handled any requests and is therefore deemed to be currently unused. In this example, the instance 206C is a candidate for prioritized deployment of the updates specified in the update queue 406. In particular, the updates identified in the update queue 406 might be applied to the instance 206C while the instance 206C remains unused, thereby causing no noticeable loss of capacity for the fleet 302. If requests are received that are directed to the instance 206C, the instance 206C might be returned to the fleet 302 and any remaining upgrades might be applied to the instance 206C at a later time.

Figure 11A:
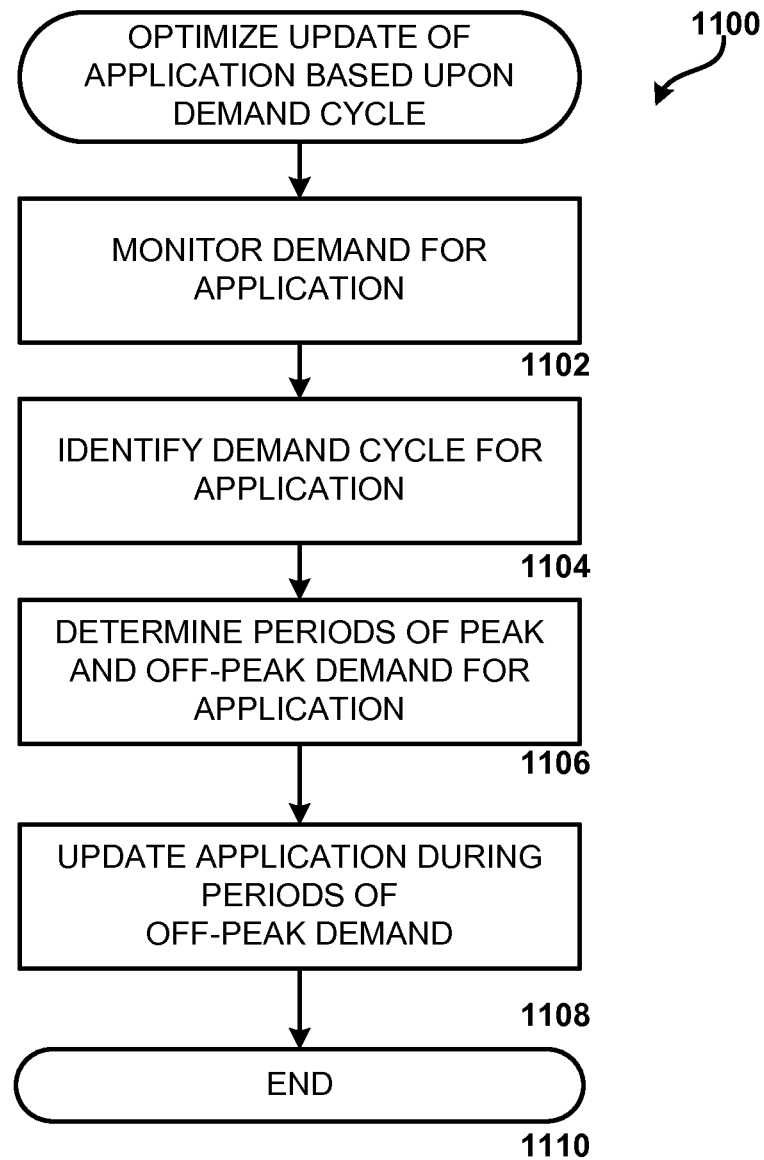
FIG. 11A is a flow diagram showing one illustrative routine for updating a PES application based upon a demand cycle, according to one embodiment disclosed herein.

FIG. 11A is a flow diagram showing one illustrative routine 1100 for updating an application based upon a demand cycle, according to one embodiment disclosed herein. As discussed briefly above, the deployment plan 410 might indicate that deployment of updates 402 to an application should occur during periods of off-peak demand for the application.

In one embodiment, a demand cycle for the application is identified through monitoring demand for the application or in another fashion. The demand cycle might be based upon a diurnal cycle or another type of cycle. Once the demand cycle has been identified, the updates 402 to the application might be applied during periods of off-peak demand, thereby potentially reducing the cost of deployment of the updates 402. The routine 1100 shown in FIG. 11A illustrates this process.

The routine 1100 begins at operation 1102, where demand for the application is monitored over a period of time and data is captured regarding the demand for the application. The routine 1100 then proceeds to operation 1104, where the demand cycle for the application, if any, is identified. For instance, certain types of applications might have a demand cycle that coincides with the diurnal cycle. Other types of applications might have other types of demand cycles based upon various factors. The demand cycle might also be specified manually such as, for instance, by an owner or operator of the application specifying the number of instances required during various times of day.

A demand cycle includes periods of peak and off-peak demand for the application. These periods of peak and off-peak demand may be predictable based upon an understanding of the demand cycle. The periods of peak and off-peak demand for the application are identified from the demand cycle at operation 1106.

From operation 1106, the routine 1100 proceeds to operation 1108, where updates 402 to the application are deployed during periods of off-peak demand. Because demand for the application is lower during these periods, it might be possible to deploy the updates 402 without purchasing additional instances to assist with the deployment or purchasing fewer instances than would be required if the updates were deployed during a period of higher demand. This might reduce the cost of deploying an update 402. The routine 1100 proceeds from operation 1108 to operation 1110, where it ends.

Figure 11B:
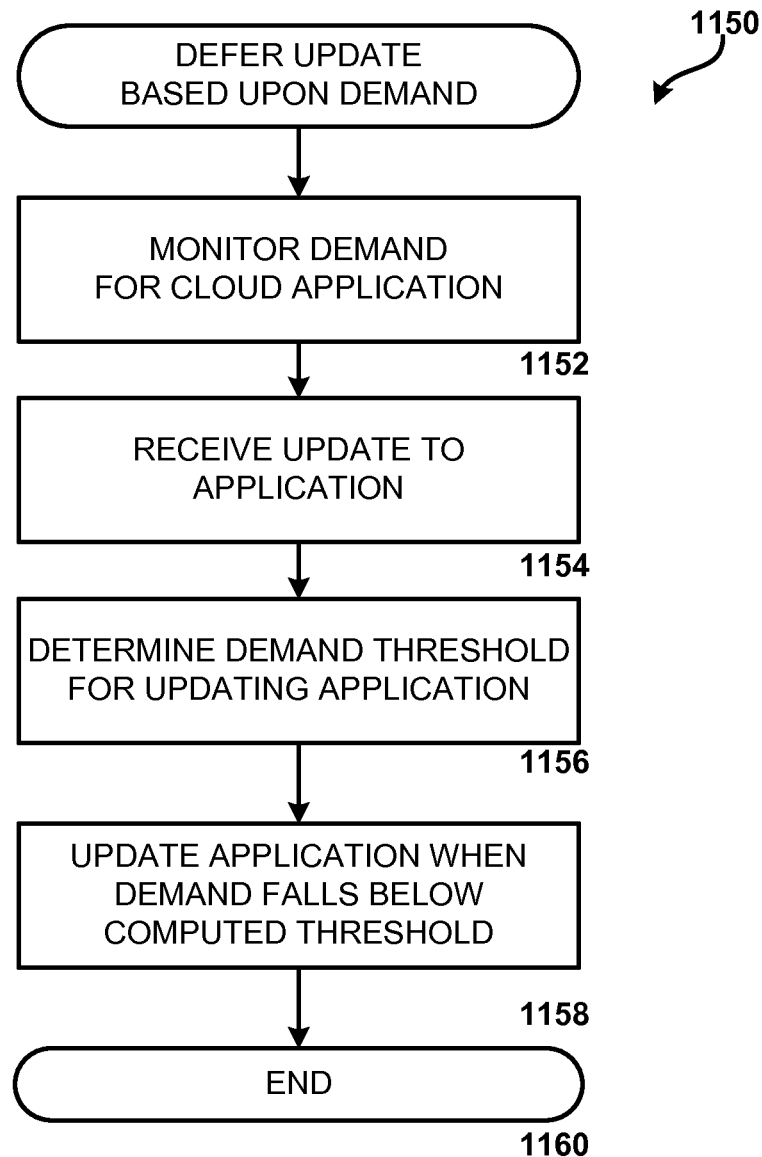
FIG. 11B is a flow diagram showing one illustrative routine for deferring the updating of a PES application based upon demand for the application, according to one embodiment disclosed herein.

FIG. 11B is a flow diagram showing one illustrative routine 1150 for deferring the updating of a PES application based upon demand for the application and/or other factors, according to one embodiment disclosed herein. In this example, the update preferences 408 are utilized to specify that the update 402 to the application is to be delayed to a future time. For instance, the update preferences 408 might be utilized to specify that the update 402 should not be applied until the demand for the application falls below a certain threshold, or that the update 402 should not be applied until the price of computing resources utilized during the update process fall below a certain price. The routine 1150 shown in FIG. 11B illustrates this process in one embodiment disclosed herein.

The routine 1150 begins at operation 1152, where demand for the application is monitored in the manner described above. The routine 1150 then proceeds to operation 1154, where an update 402 is received for the application, also as described above. The routine 1150 then proceeds to operation 1156, where a demand threshold for determining when the update 402 to the application should be applied is determined.

The threshold might be specified by an owner or operator of the application or might be computed based upon the actual demand for the application. The threshold might also be adjusted up or down based upon various factors. For instance, the threshold might be adjusted based upon the amount or number of computing resources that need to be updated, the number of new instances of computing resources needed to perform the update, the pricing of computing resources, and other factors.

Once the demand threshold has been computed at operation 1156, the routine 1150 proceeds to operation 1158, where the update 402 to the application is applied when the actual demand for the application falls below the threshold computed at operation 1156. The routine 1150 then proceeds to operation 1160, where it ends. It should be appreciated that the routine 1150 shown in FIG. 11B might be utilized to implement the functionality shown in FIG. 11A. For instance, using the routine 1150, the threshold might be set such that updates are deployed during the off-peak periods of demand encountered during a regular demand cycle, such as a diurnal, monthly, or yearly cycle.

Figure 12:
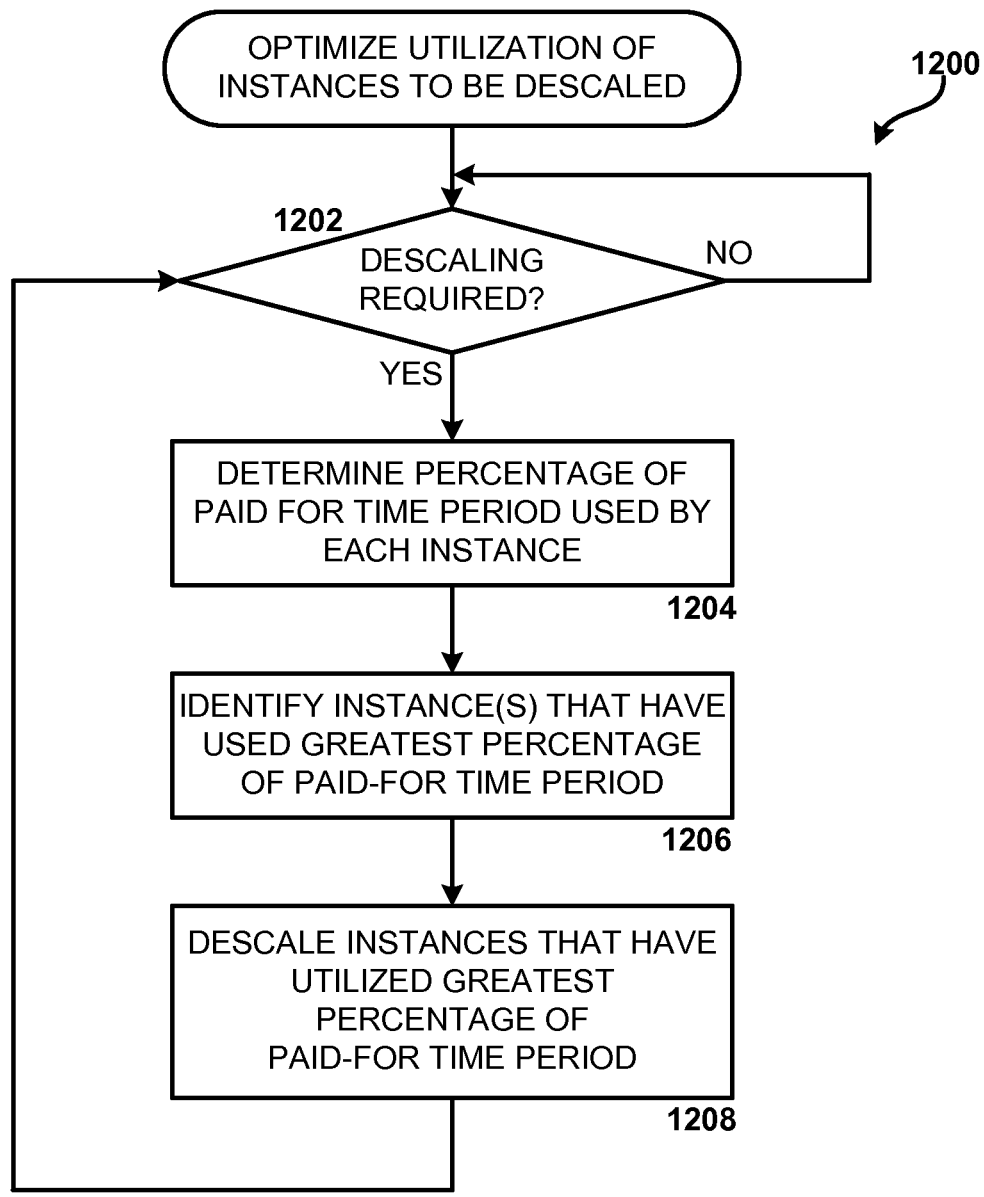
FIG. 12 is a flow diagram showing one illustrative routine for optimizing utilization of instances utilized to implement a PES application, according to one embodiment disclosed herein.

FIG. 12 is a flow diagram showing one illustrative routine 1200 for optimizing utilization of instances utilized to implement an application, according to one embodiment disclosed herein. As discussed above, the deployment plan 410 might indicate how and when unneeded instances 206 may be de-scaled during or following deployment of an update 402. For instance, it may be necessary or desirable to de-scale one or more instances 206 in a customer fleet 302 following the deployment of an update 402. The deployment plan 410 might specify that instances 206 should be de-scaled according to the percentage of a paid-for time period, such as an instance-hour, that has been utilized and/or that the instances 206 are not to be terminated until the end of a paid-for time period, such as a minute, hour, day, month, etc. The routine 1200 shown in FIG. 12 illustrates these processes according to one embodiment disclosed herein.

The routine 1200 begins at operation 1202, where a determination is made as to whether de-scaling of one or more instances 206 is required. As discussed above, instances might need to be de-scaled that have become unnecessary following a deployment of an update. Instances might also need to be de-scaled as a result of decreased demand for the application. Other factors might also result in the need to de-scale one or more instances 206. If de-scaling is required, the routine 1200 proceeds from operation 1202 to operation 1204.

At operation 1204, the percentage of the paid-for time period for each instance 206 is determined. In this regard, the PES platform 108 maintains data indicating how much of each paid-for time period has been used by each instance 206. The routine 1200 then proceeds from operation 1204 to operation 1206.

At operation 1206, the instances 206 that have utilized the greatest percentage of the paid-for time period are identified. The routine 1200 then proceeds to operation 1208, where instances 206 are de-scaled that have utilized the greatest percentage of their paid-for time period. For example, if one of two instances is to be de-scaled and one instance has used eight minutes of a paid-for instance hour while the second instance has used 50 minutes of a paid-for instance hour, the second instance will be chosen for de-scaling. From operation 1208, the routine 1200 proceeds to operation 1202, described above.

It should be appreciated that instances 206 may not be terminated until the end of a paid-for time period. In the example set forth just above, the instance 206 that has utilized 50 minutes of its paid-for instance-hour may not be terminated until the end of the paid-for instance hour. In this manner, the customer of the PES platform 108 receives the full value of the paid-for time period.

Figure 13:
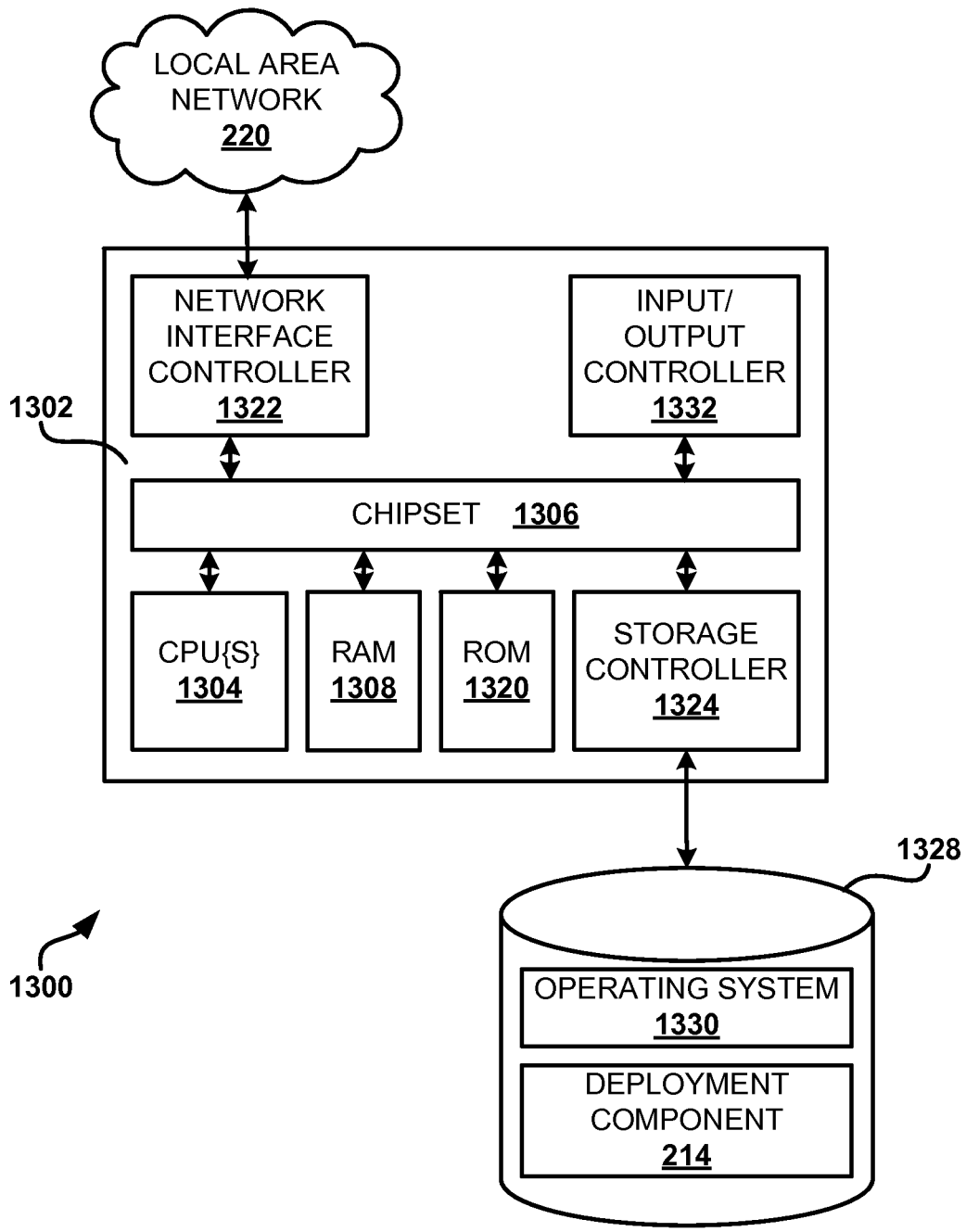
FIG. 13 is a computer architecture diagram showing an illustrative computer hardware architecture for implementing the various computing devices described in embodiments presented herein.

FIG. 13 shows an example computer architecture for a computer 1300 capable of executing the software components described above. The computer architecture shown in FIG. 13 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 1300 includes a baseboard, or "motherboard," which is a printed circuit board to which a multitude of components or devices may be connected by way of a system bus or other electrical communication paths. In one illustrative embodiment, one or more central processing units ("CPUs") 1304 operate in conjunction with a chipset 1306. The CPUs 1304 are standard programmable processors that perform arithmetic and logical operations necessary for the operation of the computer 1300.

The CPUs 1304 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1306 provides an interface between the CPUs 1304 and the remainder of the components and devices on the baseboard. The chipset 1306 may provide an interface to a random access memory ("RAM") 1308, used as the main memory in the computer 1300. The chipset 1306 may further provide an interface to a computer-readable storage medium such as a read-only memory ("ROM") 1320 or non-volatile RAM ("NVRAM") for storing basic routines that help to startup the computer 1300 and to transfer information between the various components and devices. The ROM 1320 or NVRAM may also store other software components necessary for the operation of the computer 1300 in accordance with the embodiments described herein.

The computer 1300 may operate in a networked environment using logical connections to remote computing devices and computer systems through the network 220. The chipset 1306 may include functionality for providing network connectivity through a network interface controller ("NIC") 1322, such as a gigabit Ethernet adapter. The NIC 1322 is capable of connecting the computer 1300 to other computing devices over the network 220. It should be appreciated that multiple NICs 1322 may be present in the computer 1300, connecting the computer to other types of networks and remote computer systems.

The computer 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computer 1300 through a storage controller 1324 connected to the chipset 1306. The mass storage device 1328 may consist of one or more physical storage units. The storage controller 1324 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 may store data on the mass storage device 1328 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1328 is characterized as primary or secondary storage, and the like.

For example, the computer 1300 may store information to the mass storage device 1328 by issuing instructions through the storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 may further read information from the mass storage device 1328 by detecting the physical states or characteristics of one or more particular locations within the physical storage units.

In addition to the mass storage device 1328 described above, the computer 1300 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 1300.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1328 may store an operating system 1330 utilized to control the operation of the computer 1300. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1328 may store other system or application programs and data utilized by the computer 1300, such as the deployment component 214 and/or the other software components described above.

In one embodiment, the mass storage device 1328 or other computer-readable storage media is encoded with computer-executable instructions which, when loaded into the computer 1300, transforms the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the routines 500, 1100, and 1200, described with regard to FIGS. 5, 11, and 12, respectively.

The computer 1300 may also include an input/output controller 1332 for receiving and processing input from a number of input devices, such as a keyboard, a mouse, a touchpad, a touch screen, an electronic stylus, or other type of input device. Similarly, the input/output controller 1332 may provide output to a display, such as a computer monitor, a flat-panel display, a digital projector, a printer, a plotter, or other type of output device. It will be appreciated that the computer 1300 may not include all of the components shown in FIG. 13, may include other components that are not explicitly shown in FIG. 13, or may utilize an architecture completely different than that shown in FIG. 13.

Based on the foregoing, it should be appreciated that technologies for updating an application have been presented herein. It should be appreciated that although the embodiments disclosed herein have been described in the context of deploying updates to an application, the various aspects described herein might also be utilized to deploy updates to other types of software, such as operating systems. Some of the concepts and technologies described herein might also be applied to new installations of applications.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for updating an application executing on a programmable execution service ("PES"), the method comprising:
   receiving a first update and a second update to an application executing on a plurality of virtual machine instances provided by the PES, the first update configured to update a component of the application from a first version to a second version and the second update configured to update the component of the application from the second version to a third version;
   applying the first update to the application executing on a first virtual machine instance of the plurality of virtual machine instances according to a deployment plan that is constructed based upon update preferences, the deployment plan specifying that updates to the application are to be deployed to unused virtual machine instances in a prioritized manner;
   applying the second update to the application executing on the first virtual machine instance according to the deployment plan;
   merging the first update and the second update to create a merged update;
   determining an unused virtual machine instance from the remaining virtual machine instances of the plurality of virtual machine instances;
   applying, according to the deployment plan, the merged update to the application executing on the unused virtual machine instance before applying the merged update to other virtual machine instances; and
   applying the merged update to the application executing on the other virtual machine instances according to the deployment plan.

2. The computer-implemented method of claim 1, further comprising testing the first virtual machine instance after applying the second update, and wherein the merging of the first update and the second update is performed based, at least in part, upon results of the testing.

3. The computer-implemented method of claim 2, wherein the merging of the first update and the second update is performed in response to a determination that the testing is successful.

4. The computer-implemented method of claim 1, wherein the plurality of virtual machine instances comprise one or more required virtual machine instances and one or more desired virtual machine instances, and wherein the first virtual machine instance is a desired virtual machine instance.

5. The computer-implemented method of claim 1, wherein the deployment plan further specifies that updates to the application are permitted to be merged.

6. The computer-implemented method of claim 1, further comprising:
determining that requests are received that are directed to the unused virtual machine instance; and
delaying applying the merged update to the application executing on the unused virtual machine instance.

7. The computer-implemented method of claim 1, wherein the first virtual machine instance is an unused virtual machine instance.

8. A computer system for updating a programmable execution service ("PES") application, the computer system comprising:
a plurality of server computers having a plurality of computing resource instances executing thereupon, wherein the PES application executes on the plurality of computing resource instances; and
a computing device comprising a processor configured to execute a deployment component that is configured to:
receive a first update and a second update to the PES application, the first update configured to update a component of the PES application from a first version to a second version and the second update configured to update the component of the PES application from the second version to a third version;
apply the first update to the PES application executing on a first computing resource instance of the plurality of computing resource instances according to a deployment plan that is constructed based upon update preferences, the deployment plan specifying that updates to the PES application are to be deployed to unused computing resource instances in a prioritized manner;
apply the second update to the PES application executing on the first computing resource instance according to the deployment plan;
merge the first and the second updates to create a merged update;
determine an unused computing resource instance from the remaining computing resource instances of the plurality of computing resource instances;
apply the merged update to the PES application executing on the unused computing resource instance before applying the merged update to other computing resource instances; and
apply the merged update to the PES application executing on the other computing resource instances according to the deployment plan.

9. The computer system of claim 8, wherein the plurality of computing resource instances comprises at least one virtual machine instance.

10. The computer system of claim 9, wherein the plurality of computing resource instances comprise one or more required computing resource instances and one or more desired computing resource instances, and wherein the first computing resource instance is a desired computing resource instance.

11. The computer system of claim 8, further comprising testing the first computing resource instance after applying the second update, and wherein the merging of the first update and the second update is performed based, at least in part, upon results of the testing.

12. The computer system of claim 8, wherein wherein the deployment plan further specifies that updates to the PES application are permitted to be merged.

13. The computer system of claim 8, wherein the deployment component is further configured to:
determine that requests are received that are directed to the unused computing resource instance; and
delay applying the merged update to the PES application executing on the unused computing resource instance.

14. The computer system of claim 8, wherein the first computing resource instance is an unused computing resource instance.

15. A computer-readable storage medium having computer-executable instructions stored thereupon which, when executed by a computer, cause the computer to:
receive a first update and a second update to an application executing on a plurality of computing resource instances provided by a programmable execution service ("PES"), the first update configured to update a component of the application from a first version to a second version and the second update configured to update the component of the application from the second version to a third version;
apply the first update to the application executing on a first computing resource instance of the plurality of computing resource instances according to a deployment plan that is constructed based upon update preferences, the deployment plan specifying that updates to the application are to be deployed to unused virtual machine instances in a prioritized manner;
apply the second update to the application executing on the first computing resource instance according to the deployment plan;
merge the first and the second updates to create a merged update;
determine an unused computing resource instance from remaining computing resource instances of the plurality of computing resource instances;
apply, according to the deployment plan, the merged update to the application executing on the unused computing resource instance before applying the merged update to other computing resource instances; and
apply the merged update to the application executing on the other computing resource instances according to the deployment plan.

16. The computer-readable storage medium of claim 15, having further instructions stored thereupon which, when executed by the computer, cause the computer to test the first computing resource instance after applying the second update, and wherein the merging of the first update and the second update is performed based, at least in part, upon results of the testing.

17. The computer-readable storage medium of claim 15, having further instructions stored thereupon which, when executed by the computer, cause the computer to:
determine that requests are received that are directed to the unused computing resource instance; and
delay applying the merged update to the application executing on the unused computing resource instance.

18. The computer-readable storage medium of claim 15, wherein the plurality of computing resource instances comprises at least one virtual machine instance.

19. The computer-readable storage medium of claim 15, wherein the plurality of computing resource instances comprise one or more required computing resource instances and one or more desired computing resource instances, and wherein the first virtual machine instance is a desired computing resource instance.

20. The computer-readable storage medium of claim 15, wherein the deployment plan further specifies that updates to the application are permitted to be merged.

21. The computer-readable storage medium of claim 15, wherein the first computing resource instance is an unused computing resource instance.

* * * * *